(12) United States Patent
Fukatsu et al.

(10) Patent No.: US 12,458,282 B2
(45) Date of Patent: Nov. 4, 2025

(54) MEDICAL SUPPORT SYSTEM, ENDOSCOPE SYSTEM, AND MEDICAL SUPPORT METHOD

(71) Applicant: OLYMPUS MEDICAL SYSTEMS CORP., Tokyo (JP)

(72) Inventors: Naoki Fukatsu, Hachioji (JP); Hiromasa Fujita, Hachioji (JP)

(73) Assignee: OLYMPUS MEDICAL SYSTEMS CORP., Tokyo (JP)

(*) Notice: Subject to any disclaimer, the term of this patent is extended or adjusted under 35 U.S.C. 154(b) by 139 days.

(21) Appl. No.: 18/368,665

(22) Filed: Sep. 15, 2023

(65) Prior Publication Data

US 2024/0000377 A1    Jan. 4, 2024

Related U.S. Application Data

(63) Continuation of application No. PCT/JP2021/010726, filed on Mar. 17, 2021.

(51) Int. Cl.
| | |
|---|---|
| A61B 5/00 | (2006.01) |
| A61B 1/00 | (2006.01) |
| A61B 1/31 | (2006.01) |
| A61B 5/1171 | (2016.01) |

(52) U.S. Cl.
CPC ........ *A61B 5/4824* (2013.01); *A61B 1/00009* (2013.01); *A61B 1/00094* (2013.01); *A61B 1/31* (2013.01); *A61B 5/1176* (2013.01); *A61B 5/7264* (2013.01)

(58) Field of Classification Search
CPC .............. A61B 5/4824; A61B 1/00009; A61B 1/00094; A61B 1/31; A61B 5/1176; A61B 5/7264; A61B 1/00006; A61B 1/009; A61B 1/00055; A61B 1/000096; G16H 20/40; G16H 30/40; G16H 40/63; G16H 50/20; G16H 20/10
See application file for complete search history.

(56) References Cited

U.S. PATENT DOCUMENTS

| | | | |
|---|---|---|---|
| 2004/0030367 A1* | 2/2004 | Yamaki | A61B 1/0005 607/60 |
| 2005/0054896 A1 | 3/2005 | Konishi | |
| 2011/0230712 A1 | 9/2011 | Matsuura et al. | |
| 2015/0351608 A1 | 12/2015 | Choi | |

(Continued)

FOREIGN PATENT DOCUMENTS

| | | |
|---|---|---|
| JP | H06277178 A | 10/1994 |
| JP | 2004-267461 A | 9/2004 |
| JP | 2006-288822 A | 10/2006 |

(Continued)

OTHER PUBLICATIONS

International Search Report dated Jun. 1, 2021 received in PCT/JP2021/010726.

(Continued)

*Primary Examiner* — Bo Joseph Peng
(74) *Attorney, Agent, or Firm* — Scully, Scott, Murphy & Presser, P.C.

(57) ABSTRACT

A medical support system includes a processor. The processor acquires examination status information about a status of an endoscopy using an endoscope. The processor determines a need for a sedative based on the examination status information.

19 Claims, 20 Drawing Sheets

(56) References Cited

U.S. PATENT DOCUMENTS

2020/0138269 A1    5/2020   Nishimura
2024/0000336 A1    1/2024   Fukatsu et al.

FOREIGN PATENT DOCUMENTS

| JP | 2010081950 A | * | 4/2010 |
| JP | 2017111605 A | | 6/2017 |
| JP | 2017-124107 A | | 7/2017 |
| JP | 2019005038 A | | 1/2019 |
| JP | 2021061911 A | | 4/2021 |
| WO | 2011016428 A1 | | 2/2011 |
| WO | 2018235185 A1 | | 12/2018 |

OTHER PUBLICATIONS

"Guideline for Sedation in Endoscopy (Second Edition)", The Journal of Japan Gastroenterological Endoscopy Society, vol. 62(9), Sep. 2020, pp. 1637-1680.
Japanese Office Action dated Oct. 29, 2024 received in 2023-506467.

* cited by examiner

RE-LOOP FORMED

ADDRESSING RE-LOOP

US 12,458,282 B2

MEDICAL SUPPORT SYSTEM, ENDOSCOPE SYSTEM, AND MEDICAL SUPPORT METHOD

CROSS REFERENCE TO RELATED APPLICATIONS

This application is a continuation of International Patent Application No. PCT/JP2021/010726, having an international filing date of Mar. 17, 2021, which designated the United States, the entirety of which is incorporated herein by reference.

BACKGROUND OF THE INVENTION

As shown in "Guideline for Sedation in Endoscopy (Second Edition)", the journal of Japan Gastroenterological Endoscopy Society, Vol. 62(9), September 2020, it has conventionally been known that a physician uses a sedative on a patient during an endoscopy in consideration of presence or absence of a pain communicated from the patient.

SUMMARY OF THE INVENTION

In accordance with one of some aspect, there is provided a medical support system comprising:
a processor, wherein the processor is configured to:
acquire examination status information about a status of an endoscopy using an endoscope; and
determine a need for a sedative based on the examination status information.

In accordance with one of some aspect, there is provided an endoscope system comprising:
an endoscope used for an endoscopy; and
a processor, wherein the processor is configured to:
acquire examination status information about a status of the endoscopy using the endoscope; and
determine a need for a sedative based on the examination status information.

In accordance with one of some aspect, there is provided a medical support method comprising:
acquiring examination status information about a status of an endoscopy using an endoscope; and
determining a need for a sedative based on the examination status information.

DETAILED DESCRIPTION

Figure 1:
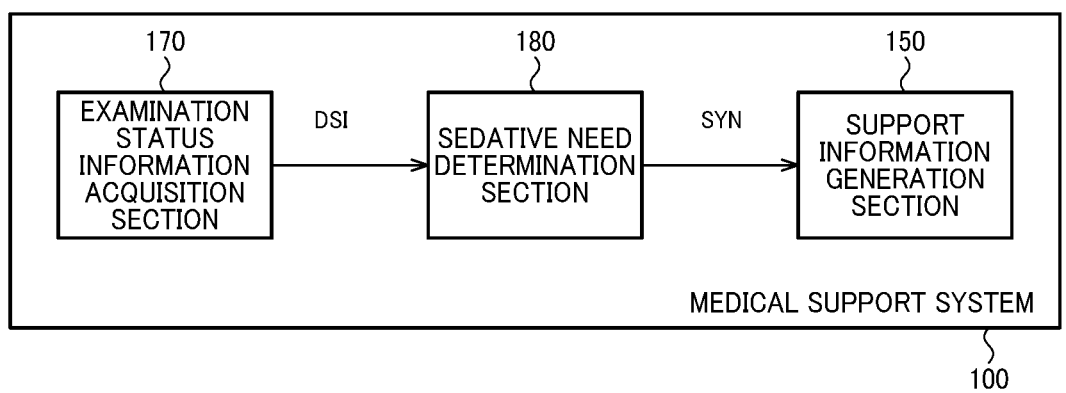
FIG. 1 is a first configuration example of a medical support system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

1. Configuration Example

Here, a basic configuration example of the medical support system according to the present embodiment will be described. The detailed configuration example of the medical support system and the correspondence of the detailed configuration example to the basic configuration example will be described later.

FIG. 1 is a first configuration example of a medical support system 100. The medical support system 100 includes an examination status information acquisition section 170, a sedative need determination section 180, and a support information generation section 150.

The examination status information acquisition section 170 acquires examination status information about a status of an endoscopy using an endoscope. The examination status information may be information based on which an examination status can be determined, for example, information based on which an insertion state of an endoscope insertion section can be determined. In addition, the examination status information may include information about examination environment or examination conditions related to a patient, or input pain information which is input from outside of the medical support system 100 through communication by a patient or the like. The examination status information acquisition section 170 outputs examination status information DSI. The examination status information DSI thus output may be the examination status information itself acquired by the examination status information acquisition section 170 as described above, or information acquired by performing processing to the acquired examination status information, or a combination thereof.

The sedative need determination section 180 determines a need for a sedative based on the examination status information. The sedative is a drug that reduces excitability, for example, a drug that provides sedation to relieve a pain being felt by a patient. When the examination status indicated by the examination status information is determined as the examination status requiring the sedative, the sedative need determination section 180 determines that the sedative is required, and determines that the sedative is not required in other cases. The sedative need determination section 180 outputs a sedative need determination result SYN. The need determination result SYN is not limited to the information indicating the need for the sedative, and may be, for example, information indicating the degree of need for the sedative.

The support information generation section 150 generates support information for a user based on the sedative need determination result SYN. Specifically, the support information generation section 150 generates the support information indicating that the sedative is required, when the sedative is determined to be required by the determination of the need. In addition, when the sedative is determined to be not required by the determination of the need, the support information generation section 150 does not generate the support information or generates the support information for a case requiring no sedative. The support information for a case requiring no sedative is, for example, information indicating an operation, an action, or a status. The operation is an operation of an endoscope according to the examination status or the insertion state, and an example thereof includes a pull operation and a right torque operation upon releasing an N loop, and the like. The action is an action taken by a medical worker or a patient depending on the examination status or the insertion state, and an example thereof includes manual compression, repositioning, and the like. The status is the examination status or the insertion state of the endoscope, and an example thereof includes occurrence of an N-loop, deflection of an endoscope insertion section, extension of a bowel, or the like.

The user is a medical worker who operates an endoscope being used for examination, an assistant who assists it, and the like. Alternatively, the user may be an insertion/removal device that automatically or semi-automatically inserts and removes an endoscope insertion section. The support information refers to the information indicating what operation or action should be performed next, for example, information presenting use or non-use of a sedative, information indicating the next operation of an endoscope to be performed, or information presenting suspension or discontinuation of examination. The support information generation section 150 may display, for example, characters, symbols, images, and the like, in accordance with the support information on a display device of an endoscope system, or may output a control signal to the insertion/removal device to cause it to perform the operation or process indicated by the support information.

According to the present embodiment, the medical support system 100 can estimate a situation requiring a sedative and generate the support information presenting the use of the sedative based on the estimation result. For example, in the above Guideline for Sedation in Endoscopy (Second Edition), a physician determines whether or not to use a sedative in response to communication from a patient. This causes a problem that a sedative may not be available if a patient endures a pain and does not make communication or if a physician is unaware of pain communication from a patient. According to the present embodiment, even if a patient endures a pain and does not make communication or a physician is unaware of pain communication from a patient, the medical support system 100 can estimate these situations and guide the use of the sedative.

The examination status information is at least one of endoscopic image recognition information, insertion section shape information, operation recognition information, patient facial expression information, pain communication information, endoscope kind information, and patient information. Note that "at least one of endoscopic image recognition information, insertion section shape information, operation recognition information, patient facial expression information, pain communication information, endoscope kind information, and patient information" is the endoscopic image recognition information, the insertion section shape information, the operation recognition information, the patient facial expression information, the pain communication information, the endoscope kind information, the patient information, or a combination of any two or more these information.

The endoscopic image recognition information refers to information about a result of recognition of an endoscopic image associated with an endoscopy. In other words, the endoscopic image recognition information refers to information obtained by image recognition processing of an endoscopic image. The endoscopic image is an image captured by an endoscope. Specifically, the endoscopic image is each of frame images of a moving image captured by an endoscope.

The insertion section shape information refers to information about a shape of an endoscope insertion section, and is acquired by, for example, the insertion shape observation device described later. The endoscope insertion section is a section of an endoscope to be inserted into a body, and in the present embodiment, an insertion section of a flexible scope used for a digestive tract and the like.

The operation recognition information refers to information about a change in at least one of a shape or a position of the endoscope insertion section. In other words, the operation recognition information is indicative of a temporal change in at least one of the shape or the position of the endoscope insertion section caused by the operation of the endoscope. For example, the insertion shape observation device observes the shape of the insertion section moment by moment to chronologically output the insertion section shape information, thereby obtaining the operation recognition information from a temporal change in the chronologically output insertion section shape information.

The patient facial expression information refers to information about a facial expression of a patient during an endoscopy. Specifically, a camera captures a facial expression of a patient and a facial expression recognition section recognizes whether or not the facial expression of the patient captured in the image is a pain expression and outputs the result thereof as the pain communication information. The pain communication information refers to information output from a communication device operated by the patient or a medical worker. Specifically, the communication device is a device such as a switch or a touch panel that can be operated by the patient or the medical worker according to a pain situation of the patient. Note that each of the camera, the facial expression recognition section, and the communication device may be included in the medical support system 100 or may be provided outside the medical support system 100.

The endoscope kind information refers to information about a kind of the endoscope insertion section used for an endoscopy. The endoscope insertion section has different physical characteristics, such as thickness or hardness, depending on the kind of the endoscope. For example, the endoscope stores an ID indicating its model, and the endoscope kind information can be obtained by acquiring the ID. Depending on the physical characteristics of the endoscope insertion section such as thickness or hardness, the likelihood of occurrence of a pain situation, a pain level and the like will vary. By acquiring the endoscope type information, the sedative need determination section 180 can appropriately determine whether or not a sedative is required according to the physical characteristics such as thickness or hardness of the endoscope insertion section.

The patient information refers to information about gender, a physique, a body type, a medical history or the like of a patient, for example. For example, as described later, the patient information can be obtained from information stored in an electronic health record. Alternatively, a medical worker may input the patient information to the medical support system 100. Depending on the gender, physique, body type, medical history or the like of the patient, the likelihood of occurrence of a pain situation, a pain level and the like will vary. By acquiring the patient information, the sedative need determination section 180 can appropriately determine whether or not a sedative is required based on the gender, physique, body type, medical history, or the like of the patient.

According to the present embodiment, it is possible to estimate whether or not a situation requires a sedative based on the various acquired information, so that the situation requiring the sedative can be estimated more appropriately. In other words, it is possible to determine various examination statuses associated with the insertion state, the examination condition and the like based on the various acquired information, and appropriately guide the need for the sedative based on the various examination statuses.

The examination status information acquisition section 170 classifies the insertion state of the endoscope based on at least one of the endoscopic image recognition information, the insertion section shape information, or the operation recognition information, and outputs the examination status information including the classification result. The sedative need determination section 180 determines the need for the sedative based on the insertion state indicated by the classification result.

The insertion state of the endoscope refers to a predetermined insertion state that appears during a procedure of an endoscopy, and is specified, for example, by a predetermined position of an insertion section, a change in the predetermined position of the insertion section, a predetermined shape of the insertion section, a change in the predetermined shape of the insertion section, a predetermined operation of the endoscope, or a combination of any two or more thereof. For example, in a colonoscopy, there are insertion methods such as a loop method and a shaft retention and shortening method, and in each insertion method, there are insertion states such as the shape of the insertion section and the operations that appear when proceeding with the insertion procedure. In each insertion state, the next operation to be performed is predetermined, and a pain easily occurs in a specific insertion state among these insertion states.

The examination status information acquisition section 170 determines which of a plurality of insertion states is being applied based on at least one of the endoscopic image recognition information, the insertion section shape information, or the operation recognition information. The plurality of insertion states includes an insertion state that requires the use of a sedative. The sedative need determination section 180 determines that the use of the sedative is required when the determined insertion state corresponds to the insertion state that requires the use of the sedative.

According to the present embodiment, since the insertion state of the endoscope is classified, the sedative need determination section 180 can determine the need for the sedative by determining whether or not the insertion state requires the use of the sedative. In addition, since there are certain insertion states that easily cause a pain during an endoscopy as described above, it is possible to make such insertion states the candidate for classification to determine whether or not the insertion state requiring the use of the sedative is applied.

The operation recognition information described above may include insertion section shape displacement information being information about shape displacement of the endoscope insertion section. In this case, the examination status information acquisition section 170 performs the above classification based on the insertion section shape information and the insertion section shape displacement information. The shape displacement refers to displacement between the shape before and after the change in the shape of the endoscope insertion section. The information about shape displacement may include information about direction of the displacement, information about magnitude of the displacement, or both.

The shape of the endoscope insertion section changes due to the operation of the endoscope, and a pain may occur in response to the shape displacement at this occasion. According to the present embodiment, the classification based on the insertion section shape displacement information enables recognition of a situation requiring a sedative that is caused by the shape displacement of the endoscope insertion section.

As described above, the insertion section shape displacement information may include shape displacement amount information being information about magnitude of the shape displacement. The examination status information acquisition section 170 performs the above classification based on the insertion section shape information and the shape displacement amount information.

In one insertion state, a pain may occur when the magnitude of shape displacement exceeds a predetermined value. According to the present embodiment, the classification based on the shape displacement amount information enables recognition of a situation requiring a sedative that is caused by the magnitude of shape displacement exceeding the predetermined value.

Figure 2:
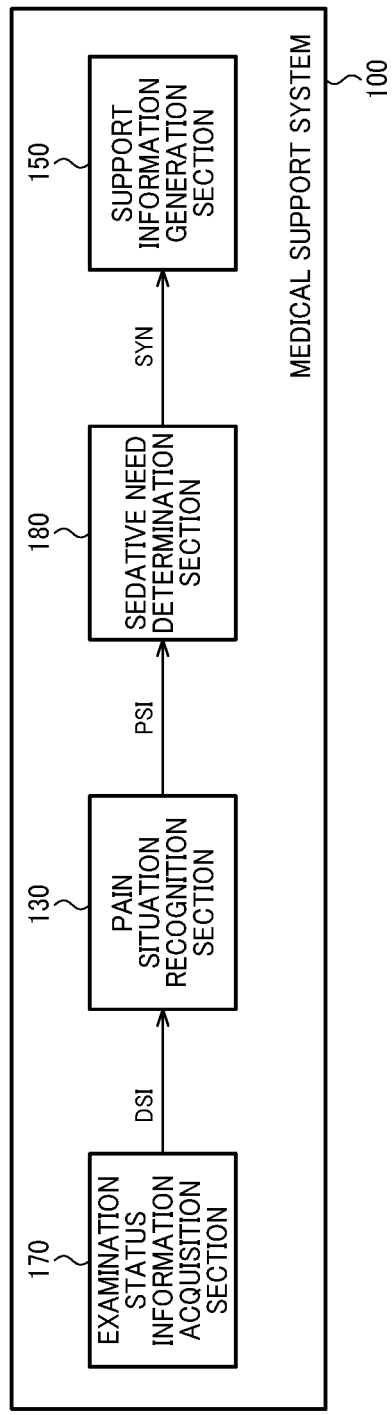
FIG. 2 is a second configuration example of a medical support system.

FIG. 2 is a second configuration example of the medical support system 100. In FIG. 2, the medical support system 100 further includes a pain situation recognition section 130. Note that the description of the same components as those already described are omitted as appropriate.

The pain situation recognition section 130 recognizes, based on the examination status information, a pain situation being a situation where a patient is suffering a pain, and acquires pain situation information PSI. The sedative need determination section 180 determines a need for a sedative based on the pain situation information. The pain situation information PSI is indicative of a result of recognition of the pain situation, for example, presence or absence of the pain situation, an estimated level of the pain, or a combination thereof. The "situation where a patient is suffering a pain" is not limited to a situation where a pain is actually occurring, but may be a situation where a pain is expected to occur. More specifically, when a situation that easily causes a pain is predetermined and a situation recognized based on the examination status information DSI corresponds to the predetermined situation, it is recognized as the "situation where a patient is suffering a pain". Alternatively, in a case where the pain situation is recognized based on the pain communication information or the patient facial expression information, it is recognized as the "situation where a patient is suffering a pain" when the pain communication information or the patient facial expression information indicating the occurrence of the pain is input.

According to the present embodiment, it is possible to guide the need for the sedative in consideration of the situation where a patient is suffering a pain during an endoscopy. In other words, a medical worker determines the use of the sedative or the like based on the support information of the present embodiments, thereby enabling recognition of the pain situation when the patient is suffering the pain or before the patient communicates the pain so as to relieve or avoid in advance the pain situation.

The pain situation described above is not limited to the presence or absence of a pain. Specifically, the pain situation recognition section 130 may recognize the pain situation by distinguishing and recognizing situations with different pain levels, different pain frequencies or different pain avoidability.

Upon recognition of the situation where a patient is suffering a pain, the pain level is a level of the pain felt by the patient in the pain situation. For example, the pain level changes depending on the amount of displacement of the endoscope insertion section in one insertion state. In this case, the pain level is determined based on the amount of displacement. Alternatively, when the pain level changes depending on the insertion state, the pain level is associated with each insertion state and upon detecting one insertion state, the pain level associated with the insertion state is to be output.

The pain frequency is a frequency of recognition of the situation where a patient is suffering a pain, for example, a number of times the pain situation is recognized per unit of time. This frequency may be any of the frequency in a case where the same insertion state is repeated or the frequency in a case where a plurality of insertion states is mixed. For example, the medical support system 100 includes a memory (not shown), the pain situation recognition section 130 stores the pain situation information PSI in the memory, and the pain frequency is detected by referring to the pain situation information PSI stored in the memory.

The pain avoidability is determined by whether or not there is an operation to relieve a pain or an operation to avoid a pain in each pain situation. For example, in one insertion state, if there is no operation to relieve or avoid a pain, the degree of pain avoidability is low. Further, in one insertion state, if there is an operation to avoid a pain, the degree of pain avoidability is high. Yet further, in one insertion state, if there is an operation to relieve a pain but no operation to avoid the pain, the degree of pain avoidability is moderate.

For example, the information indicating the pain avoidability corresponding to each pain situation is stored in a memory (not shown) and the like, and when the pain situation is recognized, the pain situation recognition section 130 can determine the pain avoidability by referring to the information indicating the pain avoidability corresponding to the pain situation.

Figure 3:
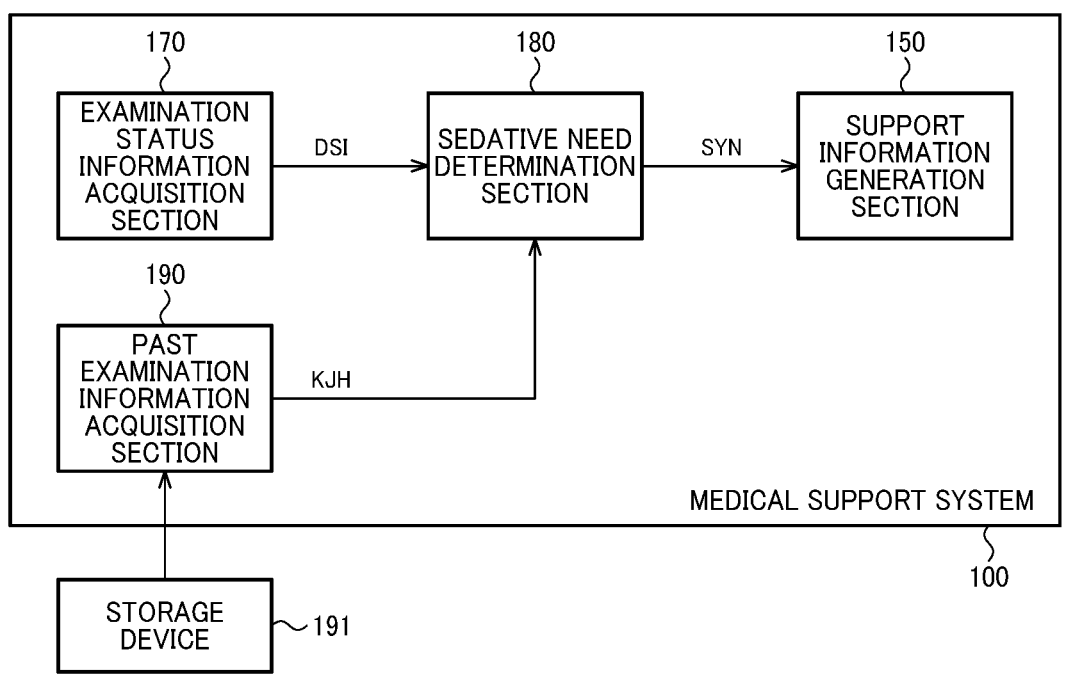
FIG. 3 is a third configuration example of a medical support system.

FIG. 3 is a third configuration example of the medical support system 100. In FIG. 3, the medical support system 100 includes a past examination information acquisition section 190. Note that the description of the same components as those already described are omitted as appropriate.

The past examination information acquisition section 190 acquires past examination information KJH being information about a past endoscopy. The sedative need determination section 180 determines a need for a sedative based on the past examination information KJH. Specifically, the sedative need determination section 180 determines that the sedative is required when the support information urging a predetermined pain avoidance operation is acquired as the past examination information KJH.

The past examination information KJH is past examination information about the same part as the current examination target. The past examination information KJH is at least one of the sedative need determination result, the contents of the support information, the endoscopic image recognition information, the insertion section shape information, or the operation recognition information associated with the past examination. The past examination information KJH may be the examination information previously acquired from the same patient as the one being currently examined, or may be the examination information previously acquired from multiple patients. For example, by recording the examination status information DSI, the sedative need determination result SYN, and the support information as a log in a storage device 191 and referring to the log recorded in the past, the past examination information KJH can be obtained. In the example illustrated in FIG. 3, the storage device 191 is provided outside the medical support system 100, but the storage device 191 may be provided inside the medical support system 100.

Note that the second and third configuration examples may be combined. In this case, the pain situation recognition section 130 may recognize the pain situation based on the examination status information DSI and the past examination information KJH to acquire the pain situation information PSI, and the sedative need determination section 180 may determine the need for the sedative based on the pain situation information PSI thus acquired.

Note that the processing by the medical support system 100 described above may be implemented as a medical support method as follows. An entity performing the medical support method is not limited to the medical support system 100, and may be various systems or apparatuses such as the endoscope system described later. The medical support method includes: acquiring the examination status information DSI regarding a status of an endoscopy using an endoscope; determining a need for a sedative based on the examination status information DSI; and generating support information for a user based on the sedative need determination result SYN.

Furthermore, some or all of the processing by the medical support system 100 described above may be realized by a program. In this case, the medical support system 100 may be configured as follows.

The medical support system 100 includes a memory that stores information, and a processor that operates based on the information stored in the memory. The information is, for example, a program and a variety of data, etc. The program describes some or all of the functions of the examination status information acquisition section 170, the past examination information acquisition section 190, the pain situation recognition section 130, the sedative need determination section 180, and the support information generation section 150. The processor executes the program, thereby realizing some or all of the functions of the examination status information acquisition section 170, the past examination information acquisition section 190, the pain situation recognition section 130, the sedative need determination section 180, and the support information generation section 150.

The processor includes hardware, which can include at least one of a circuit for processing digital signals and a circuit for processing analog signals. For example, the processor can be configured with one or more circuit devices or one or more circuit elements mounted on a circuit board. The one or more circuit devices are, for example, an IC or the like. The one or more circuit elements are, for example, a resistor, a capacitor, or the like. The processor may be, for example, a CPU (Central Processing Unit). However, the processor is not limited to a CPU, and various processors such as a GPU (Graphics Processing Unit) or a DSP (Digital Signal Processor) can be used. In addition, the processor may be an integrated circuit device such as an ASIC (Application Specific Integrated Circuit) or a FPGA (Field Programmable Gate Array). Further, the processor may include an amplifier circuit or a filter circuit for processing analog signals. The memory may be a semiconductor memory such as a SRAM and a DRAM, a register, a magnetic storage device such as a hard disk device, or an optical storage device such as an optical disk device. For example, the memory stores computer readable instructions, and the processor executes the instructions to realize the function of each section of the medical support system 100 as a process. The instruction herein may be a set of instructions that constitutes a program, or an instruction that instructs an operation for a hardware circuit of the processor.

Further, the above program can be stored, for example, in a non-transitory information storage medium which is a computer readable medium. The information storage medium can be implemented by, for example, an optical disk, a memory card, an HDD, or a semiconductor memory. The semiconductor memory is, for example, an ROM or a non-volatile memory.

2. Endoscope System

Figure 4:
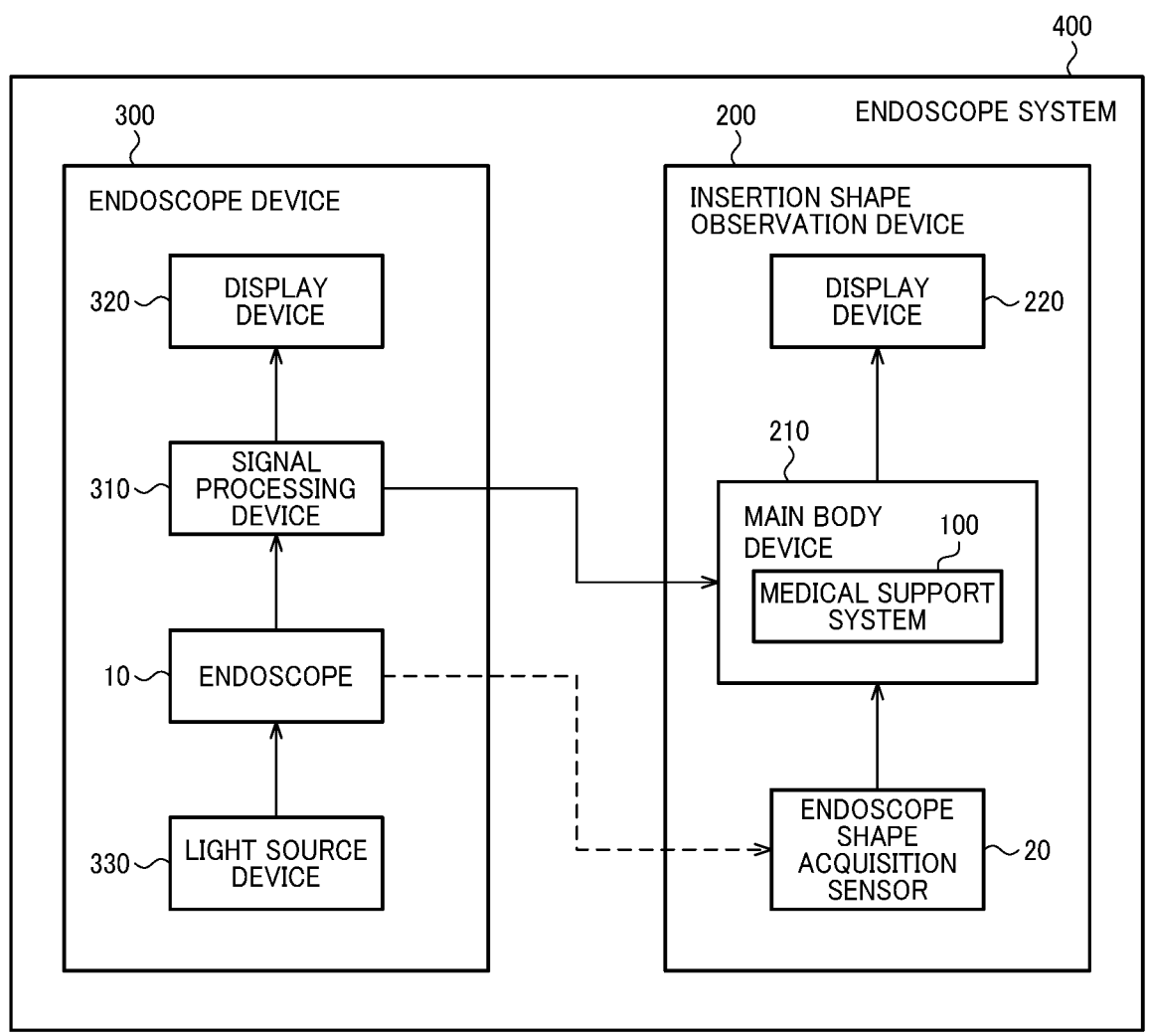
FIG. 4 is a configuration example of an endoscope system.

Hereinafter, the detailed configuration example will be described. FIG. 4 is a configuration example of an endoscope system 400 including the medical support system 100. The endoscope system 400 includes an endoscope device 300 and an insertion shape observation device 200.

The endoscope device 300 includes an endoscope 10, alight source device 330, a signal processing device 310, and a display device 320. The endoscope 10 is also called a scope, and is inserted to a body of a patient to capture an image of inside of the patient's body. The light source device 330 generates and controls illumination light, which is guided to a tip of the endoscope 10 by a light guide and is emitted from the tip of the endoscope 10. The signal processing device 310 processes image signals output from the endoscope 10 to generate an endoscopic image. In addition, the signal processing device 310 acquires an ID of the endoscope 10 and the like as the endoscope kind information. The display device 320 displays the endoscopic image generated by the signal processing device 310.

The insertion shape observation device 200 includes an endoscope shape acquisition sensor 20, a main body device 210, and a display device 220. The endoscope shape acquisition sensor 20 detects a magnetic field of a source coil provided on the endoscope insertion section. The main body device 210 acquires a position and a shape of the endoscope insertion section based on a detected signal from the endoscope shape acquisition sensor 20, and outputs an image showing the position and the shape of the endoscope insertion section to the display device 220. The display device 220 displays the image output from the main body device 210. The display devices 220 and 320 are also referred to as a monitor, which is a liquid crystal display device and the like. Note that a single display device may be provided on the endoscope system 400, and the endoscope device 300 and the insertion shape observation device 200 may share the single display device.

The medical support system 100 is provided on the main body device 210. To the medical support system 100, the endoscopic image and the endoscope kind information from the signal processing device 310, and the information about the position and the shape of the endoscope insertion section and the like acquired by the main body device 210 are input. Note that the medical support system 100 may be provided anywhere inside the endoscope system 400.

Figure 5:
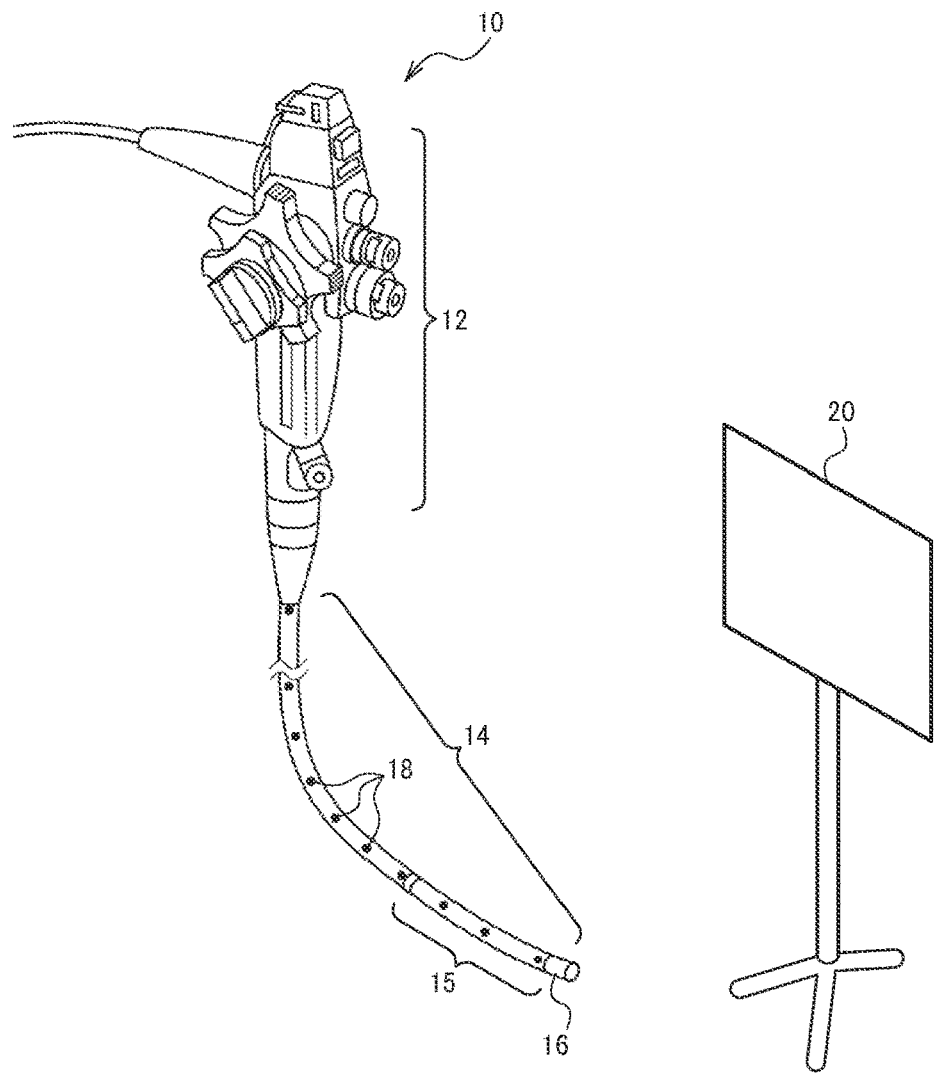
FIG. 5 is a configuration example of an endoscope and an endoscope shape acquisition sensor.

FIG. 5 is a configuration example of the endoscope 10 and the endoscope shape acquisition sensor 20. As illustrated in FIG. 5, the endoscope 10 includes an operation section 12, an endoscope insertion section 14, and a source coil 18.

The endoscope insertion section 14 has a flexible elongated shape, and includes a rigid section 16 provided on the distal end thereof and a bending section 15 available for an angle operation. The rigid section 16 is provided with an imaging device, an illumination lens, a water inlet, an air inlet, a forceps inlet, and the like.

Figure 6:
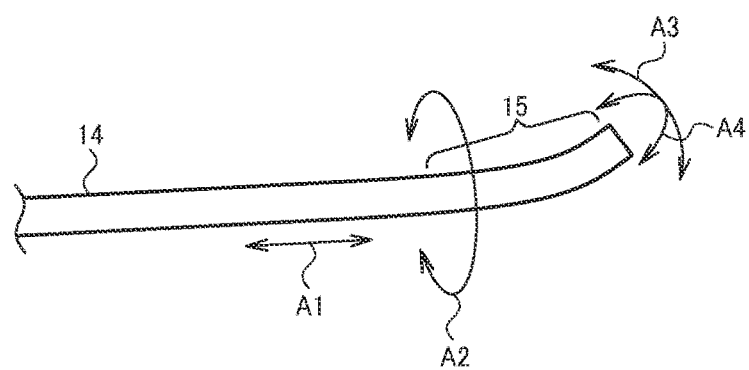
FIG. 6 is a diagram illustrating operations of an endoscope.

The operation section 12 is a device for a user to operate the endoscope 10, and includes, for example, a grip section, an angle operation dial, an air and water delivery button, and the like. FIG. 6 shows a diagram illustrating the operations of the endoscope. As illustrated by A1, a user pushes the grip section in the longitudinal direction of the endoscope insertion section 14, thereby inserting the endoscope insertion section 14. This is referred to as a push operation. In addition, the user pulls the grip section in the longitudinal direction of the endoscope insertion section 14, thereby pulling out the endoscope insertion section 14. This is referred to as a pull operation. As illustrated by A2, the user rotates the grip section in the circumferential direction of the endoscope insertion section 14, thereby rotating the endoscope insertion section 14 in the circumferential direction. This is referred to as a torque operation. When viewed from the grip section in the direction of the endoscope insertion section 14, a clockwise torque operation is referred to as a right torque operation, and a counterclockwise torque operation is referred to as a left torque operation. As illustrated by A3 and A4, the user operates the angle operation dial, thereby bending the bending section 15 of the endoscope insertion section 14 up/down and left/right. This is referred to as an angle operation. The angle operation in the up/down direction and the angle operation in the left/right direction can be performed independently from each other.

The source coil 18 generates a magnetic field. For example, a plurality of source coils 18 is provided on the endoscope insertion section 14 at predetermined intervals. The endoscope shape acquisition sensor 20 detects the magnetic field from each source coil 18, and the main body device 210 of the insertion shape observation device 200 detects a position of each source coil 18 based on a detected signal, thereby detecting the position of each portion of the endoscope insertion section 14. In addition, the main body device 210 detects the shape of the endoscope insertion section 14 based on the detected position of a plurality of source coils 18. Note that a sensing technique of the insertion shape observation is not limited to a technique using a magnetic field, and may be, for example, a technique using electromagnetic waves, ultrasound, light, and the like.

3. First Detailed Configuration Example of Medical Support System

Figure 7:
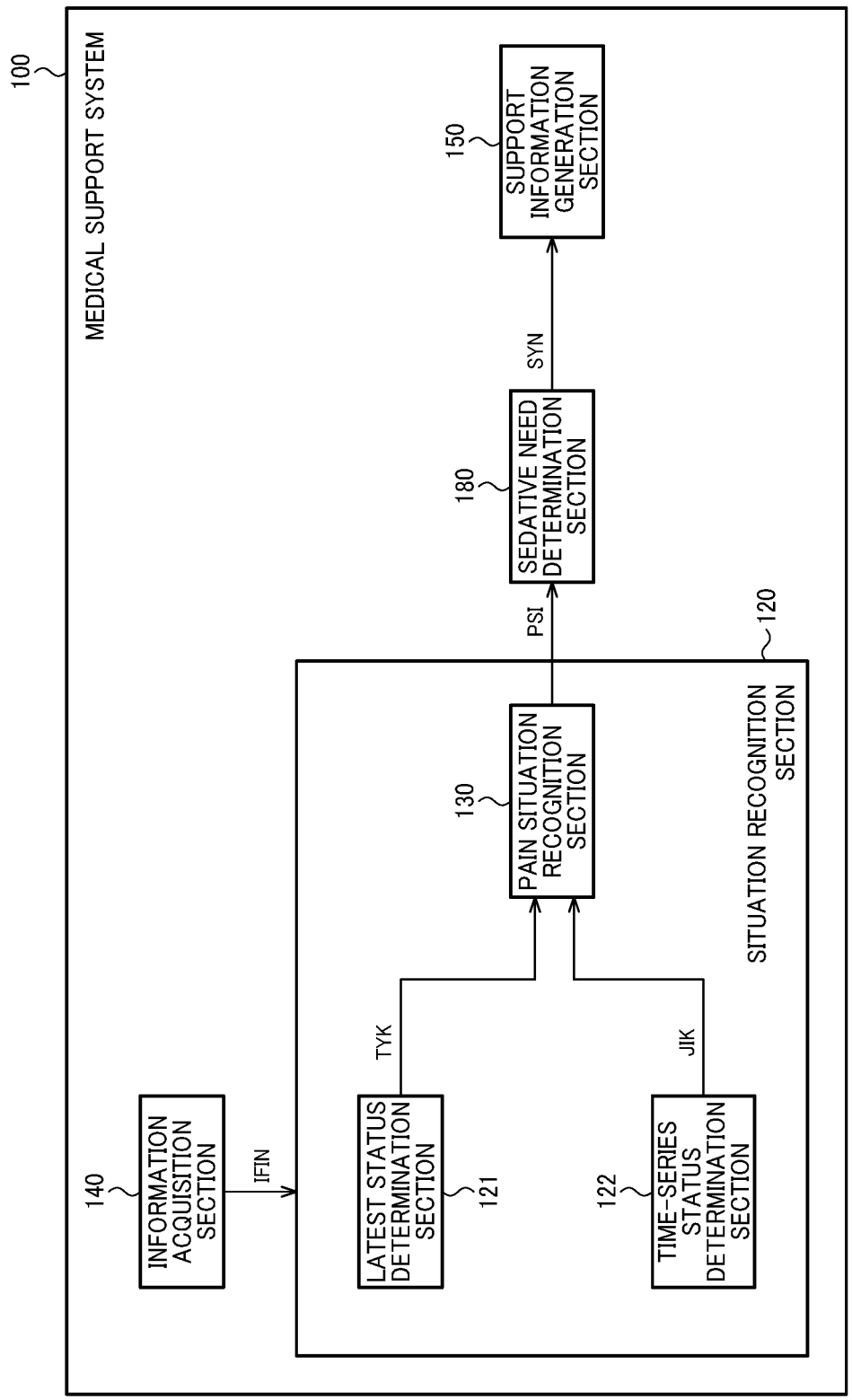
FIG. 7 is a first detailed configuration example of a medical support system.

FIG. 7 is a first detailed configuration example of the medical support system 100. The medical support system 100 includes an information acquisition section 140, the situation recognition section 120, the sedative need determination section 180, and the support information generation section 150. In the present configuration example, for example, a part of the information acquisition section 140 and a latest status determination section 121 correspond to the examination status information acquisition section 170 in FIGS. 1-3, and a part of the information acquisition section 140 and a time-series status determination section 122 correspond to the past examination information acquisition section 190 in FIG. 3. Note that the description of the same components as those already described are omitted as appropriate.

Hereinafter, an example of the medical support system 100 including the pain situation recognition section 130 will be described, but the pain situation recognition section 130 is not essential as illustrated in FIG. 1. In other words, it is not necessary to recognize the pain situation, and it is enough to recognize a situation requiring a sedative. In the following, the pain situation recognition section 130 recognizes the pain situation based on latest status information TYK and time-series status information JIK, and the sedative need determination section 180 determines a need for a sedative based on the pain situation. However, a configuration may be possible wherein the pain situation recognition section 130 is omitted, and the sedative need determination section 180 determines the need for the sedative based on the latest status information TYK and the time-series status information JIK.

The information acquisition section 140 acquires various information IFIN to be used for recognition of the pain situation. The information IFIN is, for example, the endoscopic image, the insertion section shape information, the input pain information, the endoscope kind information, the patient information, the past examination information, or a combination of any two or more thereof.

A situation recognition section 120 recognizes, from the information IFIN, a latest status, a time-series status, and the pain situation, and outputs the latest status information TYK, the time-series status information JIK, and the pain situation information PSI. The situation recognition section 120 includes the latest status determination section 121, the time-series status determination section 122, and the pain situation recognition section 130.

The latest status determination section 121 recognizes a current insertion state of an endoscope from the endoscopic image or information such as the insertion section shape information, and outputs the result thereof as the latest status information TYK. The "current" includes not only the present moment but also the most recent time including the current moment. When an operation or an operation procedure currently being performed is identified by a series of movements of the insertion section, for example, the most recent time may be long enough to recognize the series of movements of the insertion section.

The time-series status determination section 122 chronologically recognizes the insertion state including a recognition result of the past status from the past examination information and the like, and outputs the result thereof as the time-series status information JIK. The "past" is before the above "most recent time", and may be either during the current endoscopy or the previous or earlier endoscopy.

The pain situation recognition section 130 recognizes, from the latest status information TYK and the time-series status information JIK, a situation where a pain is likely to occur or a situation where a pain is occurring, and outputs the result thereof as the pain situation information PSI. The pain situation recognition section 130 utilizes not only the latest status information TYK but also the time-series status information JIK to determine the current pain situation based on the past recognition result.

The sedative need determination section 180 determines a need for a sedative based on the pain situation recognized by the pain situation recognition section 130. In other words, the sedative need determination section 180 outputs the need determination result SYN indicating that the sedative is required when the pain situation requiring the sedative is recognized, and outputs the need determination result SYN indicating that the sedative is not required when the pain situation requiring the sedative is not recognized.

The support information generation section 150 generates the support information according to the need for the sedative based on the sedative need determination result SYN. By guiding the need for the sedative according to the pain situation, a guide to relieve a pain occurred or avoid occurrence of a pain in advance can be achieved.

The situation recognition section 120 and the sedative need determination section 180 are implemented by machine learning using a neural network and the like, as one example. Specifically, a memory (not shown) stores a program describing an inference algorithm and parameters to be used for the inference algorithm as information about a trained model. Then, the processor performs processing based on the information about the trained model. In other words, the processor uses the parameters stored in the memory to execute the program, thereby executing the processing by the situation recognition section 120 and the sedative need determination section 180. Note that the situation recognition section 120 and the sedative need determination section 180 may be implemented by one trained model, or each of the situation recognition section 120 and the sedative need determination section 180 may be implemented by a separate trained model. Only a part of the situation recognition section 120 and the sedative need determination section 180 may be implemented by a trained model. In addition, in a case where the situation recognition section 120 is implemented by a trained model, the entire situation recognition section 120 may be implemented by one trained model, or each of the latest status determination section 121, the time-series status determination section 122, and the pain situation recognition section 130 may be implemented by a separate trained model. Furthermore, only some of the latest status determination section 121, the time-series status determination section 122, and the pain situation recognition section 130 may be implemented by a trained model.

A neural network can be employed as the inference algorithm, for example. The parameter is a weighting factor of internode connection in the neural network. The neural network includes an input layer to which input data is input, an intermediate layer that performs an operation process to the data input by the input layer, and an output layer that outputs a result of recognition based on the operation result output from the intermediate layer. The inference algorithm is not limited to a neural network, but can employ various techniques of machine learning used for recognition processing. A training process will be described by taking a case where the entire situation recognition section 120 is implemented by one trained model for example. In this case, the input data is the information IFIN, and the result of recognition is the latest status information TYK, the time-series status information JIK, and the pain situation information PSI. A training device that performs the training process is, for example, an information processing device such as PC. The training device inputs training data to a training model and provides feedback to the training model based on the result of recognition, thereby generating a trained model. The training data includes a plurality of sets of data, and each set includes the input data and correct answer data. The correct answer data is the result of recognition obtained for the input data and is prepared in advance by a medical worker and the like.

Hereinafter, an example of applying the medical support system 100 to a colonoscope will be described. However, an application target of the medical support system 100 is not limited to a colonoscope. In addition, the use of a sedative shall be hereinafter referred to as sedation.

Examples (a)-(c) of the latest status information TYK and an example (d) of the time-series status information JIK will be described.

Figure 8:
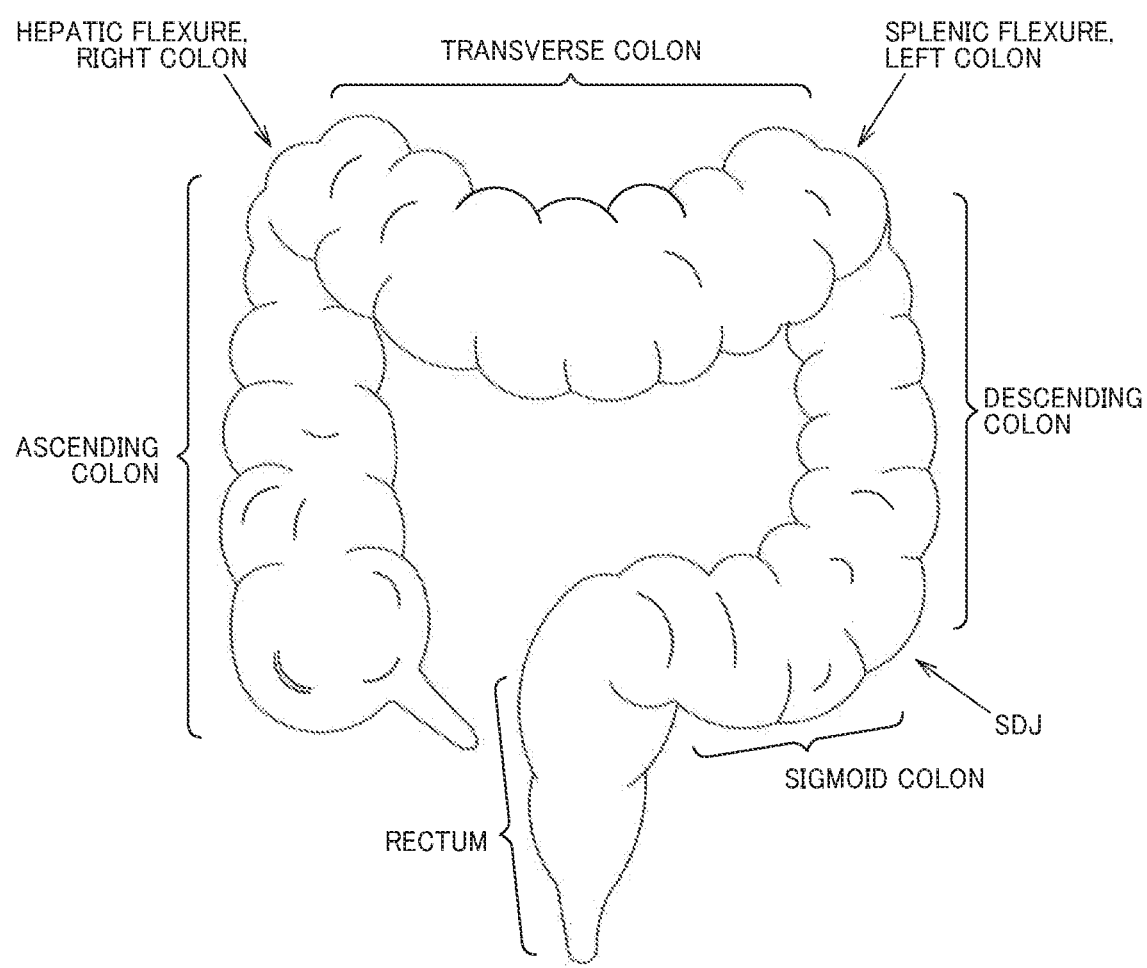
FIG. 8 is a diagram illustrating parts of a large intestine.

(a) The latest status determination section 121 performs image recognition processing of an endoscopic image, thereby acquiring the below information.

a1: Parts in which the endoscope insertion section exists. FIG. 8 is a diagram illustrating the parts of the large intestine. The parts of the large intestine include, from cecum to anus, ascending colon, hepatic flexure, transverse colon, splenic flexure, descending colon, SDJ, sigmoid colon, and rectum. The area around the hepatic flexure is also called right colon and the area around the splenic flexure is also called left colon. The SDJ stands for Sigmoid Descending colon Junction and is a boundary between the sigmoid colon and the descending colon. The parts are recognized from an image using characteristics of the image that differs depending on the parts. Note that a length of the portion of the endoscope insertion section being inserted in a patient can be obtained from the insertion section shape information, and the parts can be estimated from this insertion length.

a2: Optimal distance, earthen tubular shape, red ball, or residue. The optimal distance and the earthen tubular shape refer to the distance between the distal end of the insertion section and an intestinal wall in the shaft retention and shortening method. The optimal distance can be obtained by suction, a push operation, or a pull operation, and is the distance between the insertion section and the intestinal wall optimal for an angle operation, a torque operation, or both to turn over folds. Achieving the optimal distance eliminates the need for the push operation when going over the folds, which can prevent the occurrence of a pain due to the push operation. The earthen tubular shape refers to a state where the optimal distance is not achieved and the distal end of the insertion section is far from the intestinal wall. The red ball refers to a state where the distal end of the insertion section is in contact with a mucosa of the intestinal wall and the image is in red color of the mucosa due to the contact. The residue refers to a state where water or the like remains on the intestinal wall.

a3: Intestinal movements. The intestinal movements include advance/retreat, parallel movement, rotation, or peristaltic movement. The advance/retreat means that the endoscope insertion section and an intestinal tract relatively move in an optical axis direction. The parallel movement means that the endoscope insertion section and the intestinal tract relatively move in the direction orthogonal to the optical axis. The rotation means that the endoscope insertion section and the intestinal tract relatively rotate about the optical axis as a central axis. The peristaltic movement is a motion performed by the large intestine to transfer contents.

a4: Suction or insufflation. The suction refers to suction of gas in the large intestine. The suction draws the intestinal wall to the distal end of the insertion section. The insufflation is to send gas into the large intestine. The large intestine is inflated by the insufflation and the distal end of the insertion section is separated from the intestinal wall.

Figure 9:
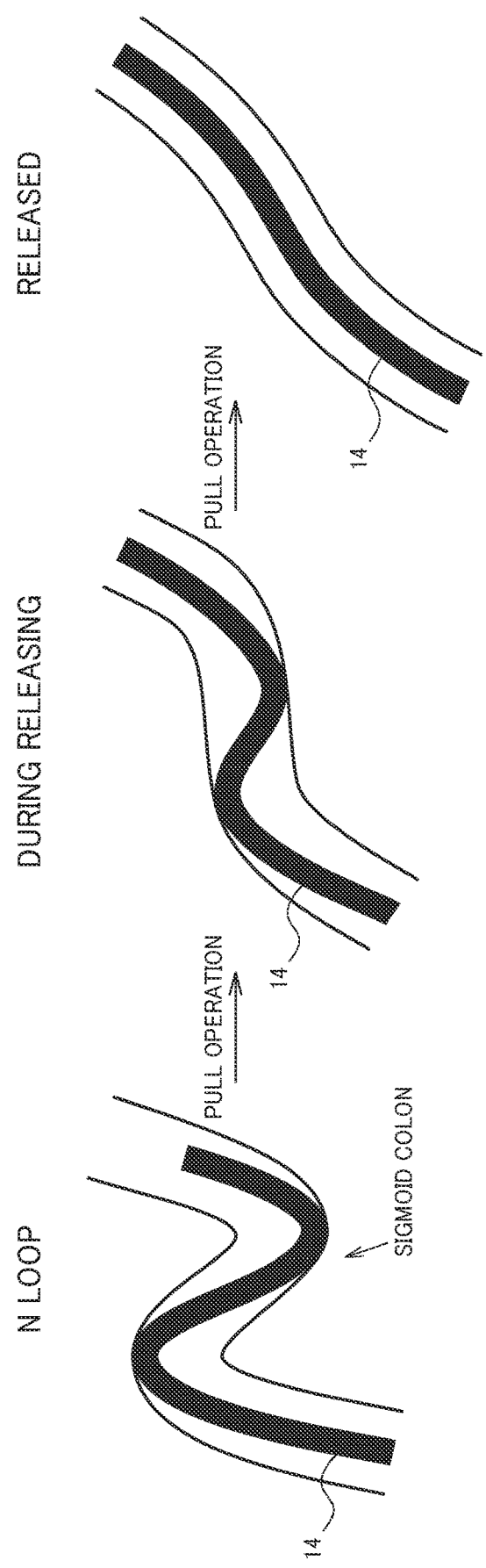
FIG. 9 is an example of shape transition of an endoscope insertion section.

(b) The latest status determination section 121 performs recognition processing to the insertion section shape information, thereby acquiring the below information.

b1: Shape of the endoscope insertion section. The "shape" herein refers to a shape at a certain moment such as the present time.

b2: Type of a loop in the loop method. In addition, shape transition of the endoscope insertion section before, during, and after performing the loop method. The type of the loop includes an N loop, an α loop, a reverse α loop, or a γ loop, identified by the shape of the loop formed by the endoscope insertion section. FIG. 9 is an example of the shape transition of the endoscope insertion section. Described herein is an example of the shape transition upon releasing the N loop. The loop method is used for passing the endoscope insertion section through the sigmoid colon. When the N loop is formed, the endoscope insertion section has a substantially N-shape. The N loop is gradually released by performing the pull operation, and once released, the endoscope insertion section becomes a substantially linear shape. During releasing, the endoscope insertion section has an intermediate shape between the substantially N-shape and the substantially linear shape. By recognizing this shape transition, it is possible to recognize that the N loop has been properly released.

b3: Shape transition of the endoscope insertion section before, during, and after performing the shaft retention and shortening method. The shaft retention and shortening method is used for passing the endoscope insertion section through the sigmoid colon. The shaft retention and shortening method repeats the angle operation for getting over the folds of the intestinal wall and the torque operation for folding the folds, thereby passing through the sigmoid colon. The shape transition resulting from these operations is to be detected.

b4: Shape transition of the endoscope insertion section during performing a transverse colon operation. The transverse colon operation refers to shortening of mid-trans of the transverse colon. Similar to the loop method and the like, the shape transition resulting from the transverse colon operation is to be detected.

b5: Deflection of the endoscope insertion section or extension of the intestinal wall due to the endoscope insertion section. The deflection of the endoscope insertion section means that the distal end of the insertion section does not move and the middle of the insertion section deflects when the push operation is performed. The extension of the intestinal wall due to the endoscope insertion section means that a free colon of the large intestine is pushed by the endoscope insertion section and as a result, the intestinal wall between the pushed portion and a fixed colon of the large intestine extends. In FIG. 8, the free colon is the sigmoid colon and transverse colon, and the fixed colon is the rectum, ascending colon, and descending colon.

(c) The latest status determination section 121 acquires the below operation recognition information based on the shape displacement of the endoscope insertion section.

c1: Whether or not the push operation, pull operation, torque operation, or angle operation is available for performing the shaft retention and shortening method, the loop method, or the shortening. Based on the direction or amount of displacement of the endoscope insertion section or both, it is determined whether or not a pain will occur when the operation is performed or when the operation is continued.

(d) The time-series status determination section 122 acquires the below information based on the past examination information.

d1: Support information previously generated, result of image recognition, result of shape recognition, or operation recognition information. By acquiring the past examination information accumulated in the storage device, such information can be obtained.

An example of a relationship between the above information and sedation will be described by taking "a4: Suction or insufflation" for example.

The suction relates to the pain situation (1) or (3) described later. When there is a movement of the intestinal wall approaching the tip of the endoscope due to the suction, there is no need to bring the endoscope closer to the intestinal wall by an operation such as the push operation or the pull operation that can cause a pain. Therefore, when there is the movement of the intestinal wall approaching the tip of the endoscope due to the suction, possibility of occurrence of a pain is reduced. On the other hand, when there is no movement as described above, it is necessary to bring the endoscope closer to the intestinal wall by an operation such as the push operation or the pull operation that can cause a pain. Thus, in this case, possibility of a pain caused by an operation to be performed is increased.

Accordingly, the examination status information acquisition section 170 acquires the examination status information DSI regarding whether or not the intestinal wall comes close to the tip of the endoscope due to the suction by the endoscope. The sedative need determination section 180 determines that the sedative is required when the intestinal wall does not come close to the tip of the endoscope even by performing the suction by the endoscope.

According to the present embodiment, when the suction is recognized as ineffective, that is, there is no movement of the intestinal wall approaching the tip of the endoscope due to the suction, it is determined that a pain can easily occur and thus, the sedative need determination section 180 can urge sedation early.

The insufflation relates to inflation of the intestinal tract due to the insufflation in the pain situation (23) described later. If the insufflation sends a large amount of air to the large intestine and inflates the intestinal tract, a pain occurs. Accordingly, when it is recognized that the intestinal tract is inflated by the insufflation, the pain situation recognition section 130 determines that a pain can easily occur and the sedative need determination section 180 urges sedation.

Next, the pain situation recognized based on the above latest status information TYK and the time-series status information JIK will be described.

The sedative need determination section 180 determines that a sedative is required when a situation where a pain is caused by extension of the intestinal wall of the large intestine, a situation where a pain is caused by a mesentery being pulled, a situation where a pain is caused by the endoscope insertion section pushing the intestinal wall, or a situation where a pain is caused by a relationship between the fixed colon of the large intestine and the endoscope insertion section is recognized based on the examination status information DSI. The "relationship between the fixed colon of the large intestine and the endoscope insertion section" is a relationship in which the endoscope insertion section pushes or pulls the fixed colon by the operation of the endoscope. Note that this relationship is not indicative of an estimate of a force, but is estimated based on the position, shape, positional displacement, or shape displacement of the endoscope insertion section or the like.

The above four situations correspond to the main insertion states that cause a pain in a patient during a colonoscopy. The pain situation recognition section 130 recognizes these insertion states, thereby enabling recognition of the pain situation where a patient is suffering a pain.

Specific examples (1)-(23) of the pain situation will be described.

(1) Situation where the push operation is performed with no looping. This pain situation corresponds to the insertion state in which the intestinal wall is stretched by the push operation with no looping.

(2) Situation where the right torque operation is performed with a reverse a loop being formed. The reverse a loop is released by the left torque operation: conversely, the loop is not released when the right torque operation is performed, which can cause a pain. The insertion state in which the reverse a loop is not released by the right torque operation corresponds to this pain situation.

(3) Situation where the push operation is performed with looping. This pain situation corresponds to the insertion state in which the intestinal wall is stretched by the push operation with an N loop being formed.

Figure 10:
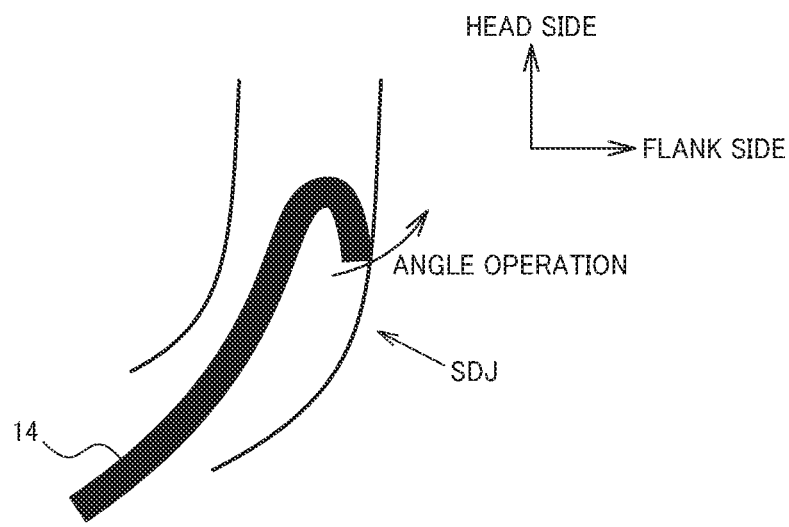
FIG. 10 is a diagram illustrating a pain situation.

(4) Situation where a push up operation toward the flank or head side is performed near the SDJ by the angle operation of the endoscope. FIG. 10 shows a diagram illustrating this pain situation. Since the SDJ is proximal to the boundary between the sigmoid colon and the descending colon, the descending colon as the fixed colon is pushed when the area around the SDJ is pushed up, which can cause a pain. A position of the source coil 18 provided on the endoscope insertion section 14 is detected with respect to a position of the endoscope shape acquisition sensor 20. Therefore, based on a relative positional relationship between the patient and the endoscope shape acquisition sensor 20, the flank side direction and the head side direction in the detected shape of the insertion section can be determined.

(5) Situation where the push up operation toward the head side is performed near the SDJ by the torque operation and the angle operation of the endoscope. Similar to (4), the descending colon as the fixed colon is pushed, which can cause a pain.

(6) Situation where an operation is performed near the SDJ with the endoscope insertion section being bent. This pain situation corresponds to the insertion state in which the fixed colon is pushed by the operation performed near the SDJ which is proximal to the fixed colon. For example, it is a situation where the operation is performed in an angled state with the N loop and the like being formed, or the like.

Figure 11:
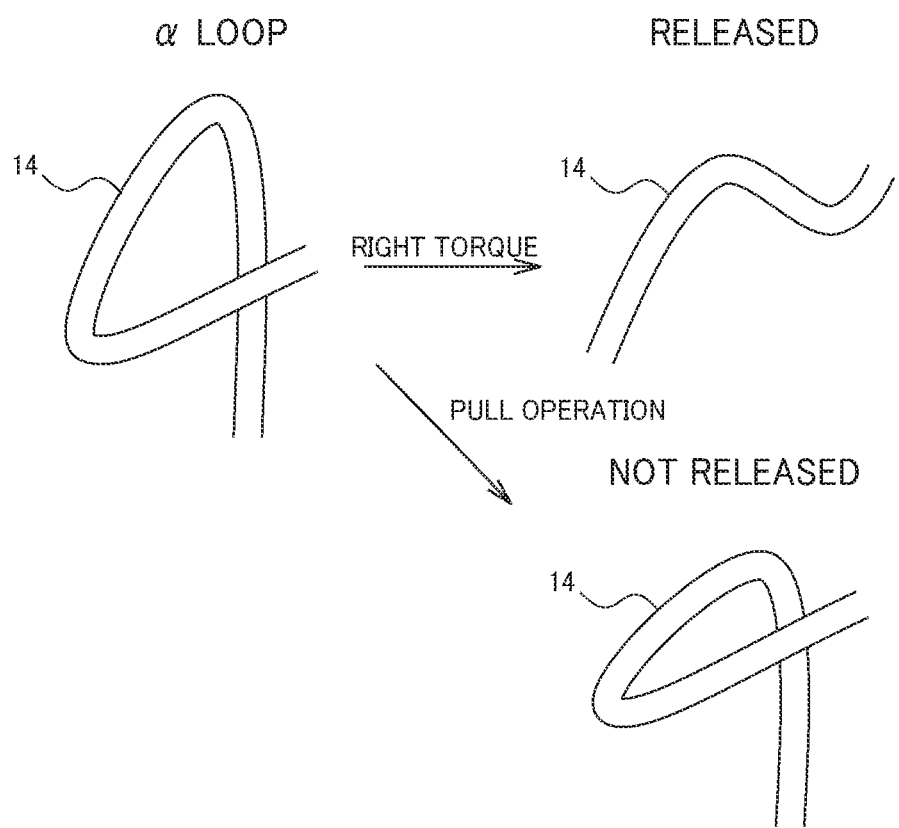
FIG. 11 is a diagram illustrating a pain situation.

(7) Situation where the pull operation is performed with looping of the endoscope. FIG. 11 shows a diagram illustrating this pain situation. Here, an example of an a loop will be described, but it may be other loops. The a loop is released by the right torque operation. When the pull operation is performed with the a loop being formed, the loop is not released and may cause a pain.

(8) Situation where the pull operation is performed with no looping. This pain situation corresponds to the insertion state of too much pulling or pulling in a wrong direction during the pull operation with no looping.

(9) Situation where an operation is performed when there are adhesions. This pain situation corresponds to the insertion state in which a portion of the endoscope insertion section gets caught and stuck on the intestinal wall during the pull operation. In the stuck portion of the intestinal wall, there are suspected adhesions. For example, the distal end of the endoscope insertion section gets caught in the adhesion portion. In this case, the distal end does not move in the pull operation and the shape of the other portion changes. Alternatively, there is no change in the endoscopic image. By recognizing these, it is possible to recognize this pain situation.

(10) Situation where the push up operation is performed around a boundary between the fixed colon and the free colon by the push operation or the pull operation. The boundary between the fixed colon and the free colon is the SDJ or the splenic flexure. Similar to (4), the fixed colon is pushed, which can cause a pain.

(11) Situation where the push operation is performed for the splenic flexure. Since there is a diaphragm on the head side of the splenic flexure, the splenic flexure is pushed against the diaphragm by the push operation, which can cause a pain.

Figure 12:
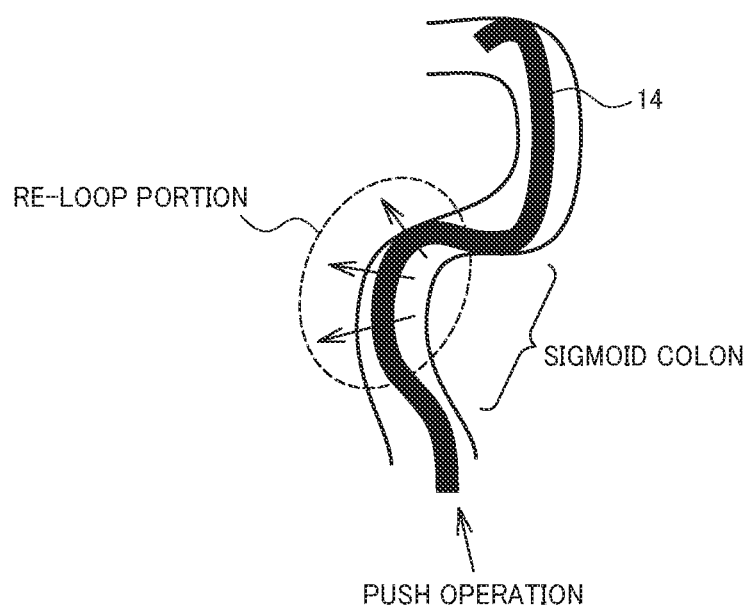
FIG. 12 is a diagram illustrating a pain situation.

(12) Situation where the push operation is performed when the distal end of the endoscope insertion section exists in any of the splenic flexure, transverse colon, or hepatic flexure, and a re-loop is formed in the sigmoid colon. FIG. 12 shows a diagram illustrating this pain situation. Provided herein is an example in which the distal end of the endoscope insertion section exists in the splenic flexure. When performing the push operation to pass through the splenic flexure, the insertion section around the sigmoid colon may be deflected with the distal end of the insertion section being stuck in the splenic flexure. The deflected portion of the insertion section around the sigmoid colon is referred to as a re-loop. In this state, when performing the push operation at a certain level or more, the re-loop is inflated to cause extension of the intestinal wall. By recognizing that the distal end of the endoscope insertion section does not move and the re-loop is displaced at a certain amount or more, it is possible to recognize this pain situation.

Figure 13:
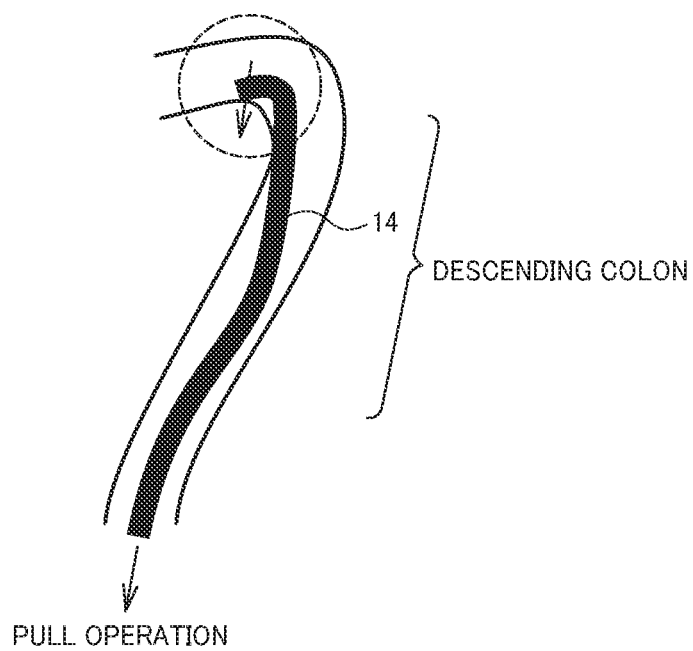
FIG. 13 is a diagram illustrating a pain situation.

(13) Situation where the distal end of the endoscope insertion section exists in any of the splenic flexure, transverse colon, or hepatic flexure, and the pull operation is performed upon addressing the re-loop in the sigmoid colon. FIG. 13 shows a diagram illustrating this pain situation. Provided herein is an example in which the distal end of the endoscope insertion section exists in the splenic flexure. Although the re-loop is released by the pull operation, a pain may be caused by performing the pull operation while the bent distal end of the insertion section is stuck in the upper end of the descending colon. Similar to (12), based on difference between the movement of the distal end of the insertion section and the movement of the other portion, it is possible to recognize this pain situation.

Figure 14:
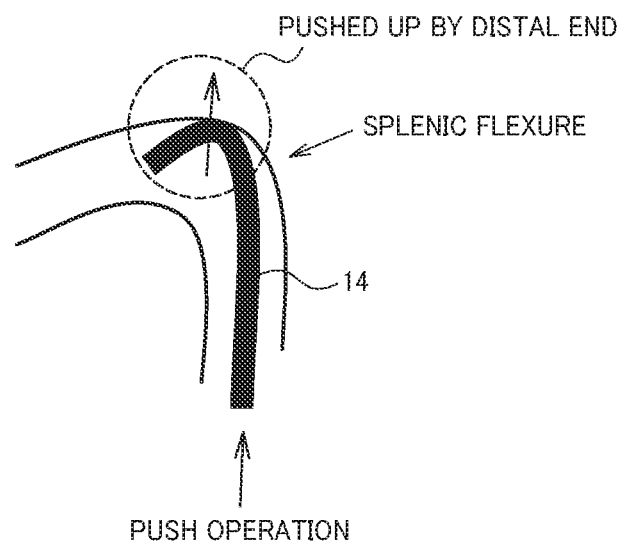
FIG. 14 is a diagram illustrating a pain situation.

(14) Situation where the left colon is pushed up from the splenic flexure by the push operation of the endoscope. FIG. 14 shows a diagram illustrating this pain situation. The splenic flexure is pushed up by performing the push operation while the endoscope insertion section is in contact with the splenic flexure. This can cause extension of the left colon or pushing against the diaphragm.

(15) Situation where the splenic flexure is pulled down from the descending colon to the anus side or the right colon leaps up to the head side by a shortening operation. When the pull operation is performed for shortening the mid-trans, the distal end of the insertion section in the right colon goes up to the head side and the insertion section around the splenic flexure goes down to the anus side. Because of this, the ascending colon as the fixed colon is pulled or the descending colon as the fixed colon is pushed, which can cause a pain.

(16) Situation where the splenic flexure is pushed up to the head side by the push operation upon insertion to the mid-trans. When the endoscope insertion section exists in a hanging down portion of the transverse colon, there is possibility that the insertion section around the splenic flexure is deflected to the head side and the splenic flexure is pushed up by the push operation.

(17) Situation where the right colon is pulled toward the left flank side by the angle operation during the shortening operation.

(18) Situation where the hepatic flexure is pushed up by the angle operation.

(19) Situation where the hepatic flexure is pushed up by the push operation.

(20) Situation where the splenic flexure is pushed up by the push operation when the distal end of the endoscope insertion section is in the hepatic flexure.

(21) Situation where after reaching the hepatic flexure, the splenic flexure is pulled toward the anus side by the pull operation.

(22) Situation where the splenic flexure is pulled toward the anus side by the pull operation in the splenic flexure.

(23) Situation where the intestinal tract is inflated by insufflation.

Figure 15:
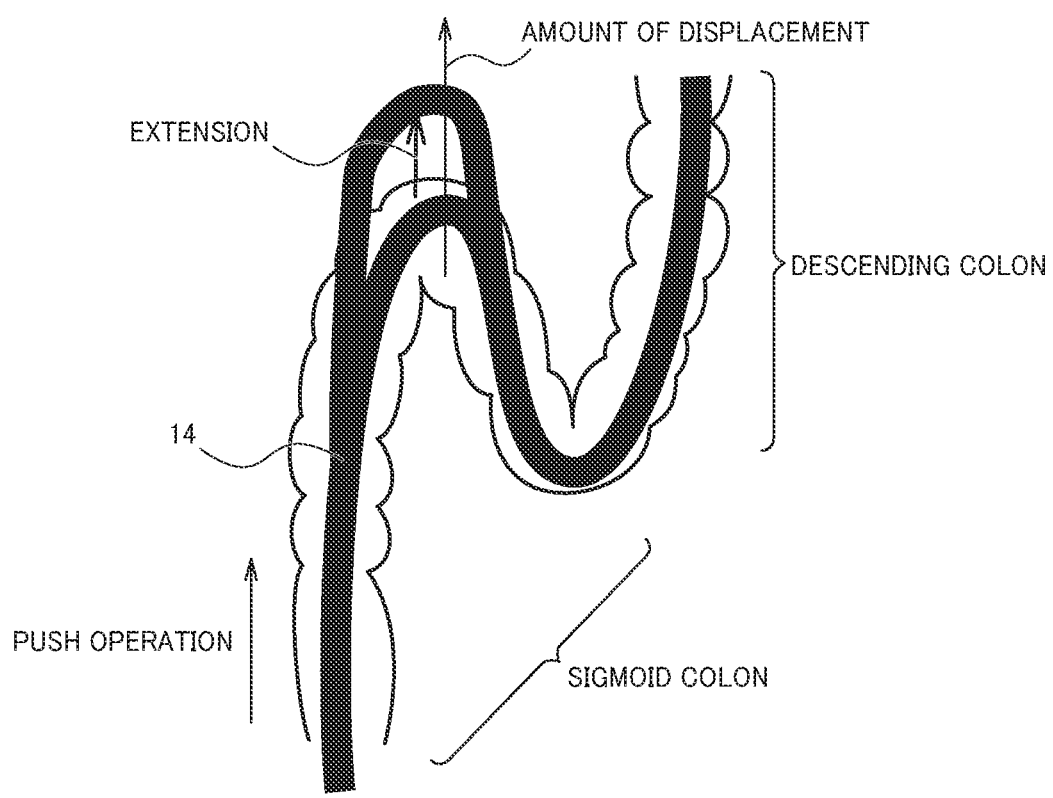
FIG. 15 is a diagram illustrating recognition of a pain situation according to amount of displacement.

Note that the pain situation recognition section 130 may recognize that the pain situation is caused when the amount of displacement exceeds a predetermined value in each situation. As illustrated in FIG. 15, in the above situation (3), when the N loop is detected and the amount of displacement of a convex of the loop is equal to or greater than a predetermined value, it may be recognized as the pain situation. Since the degree of extension varies depending on the amount of displacement, the pain situation is to be recognized when the amount of displacement reaches the amount that causes a certain amount or more extension.

Further, the pain situation recognition section 130 may determine the pain level in each situation based on the amount of displacement. For example, in FIG. 15, when the amount of displacement of the convex of the loop is equal to or greater than a first predetermined value, it may be determined as a first pain level, and when the amount of displacement of the convex of the loop is a second predetermined value, it may be determined as a second pain level. When the second predetermined value is greater than the first predetermined value, the second pain level indicates a stronger pain than the first pain level.

Figure 16:
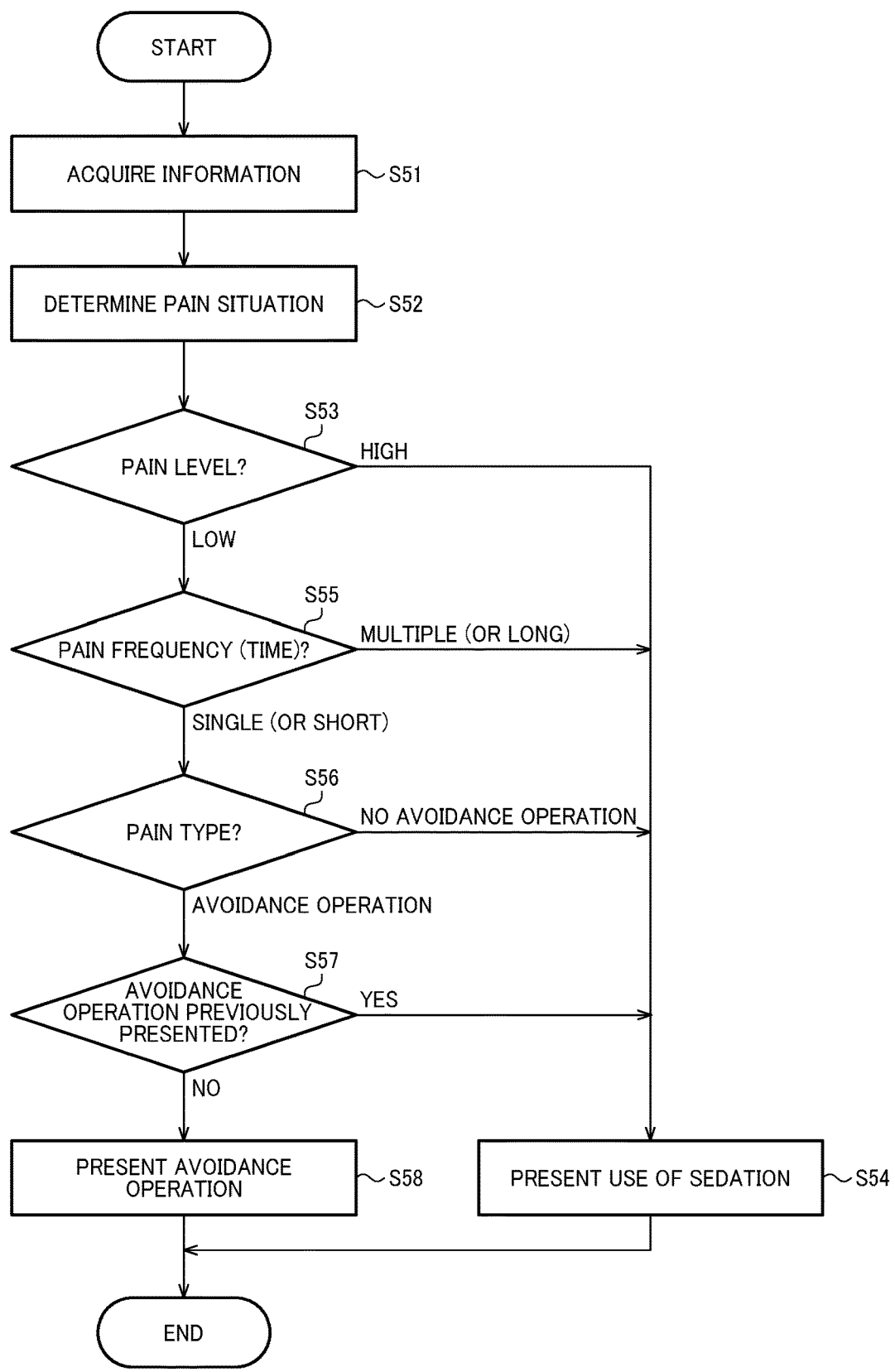
FIG. 16 is a flowchart of processing performed by the medical support system in the first detailed configuration example.

FIG. 16 is a flowchart of processing performed by the medical support system 100 in the first detailed configuration example. Note that in this flowchart, the steps S53 and S55-S57 correspond to the determination of the need for the sedative illustrated in FIG. 1.

In the step S51, the information acquisition section 140 acquires the information IFIN. In the step S52, the situation recognition section 120 determines presence or absence of a pain based on the information IFIN. In addition, when the situation recognition section 120 determines that the pain situation is caused, it outputs, as the pain situation information PSI, information about the pain level, information about the pain frequency, information about the type of the pain, and the support information previously presented. The information about the type of the pain is the information indicating which one of the above pain situations (1)-(23) corresponds to the pain.

In the step S53, the sedative need determination section 180 determines whether or not the pain level is greater than a predetermined level.

When the sedative need determination section 180 determines that the pain level is greater than the predetermined level in the step S53, the sedative need determination section 180 determines that sedation is required and the support information generation section 150 generates the support information that presents the use of sedation in the step S54. In other words, when an unbearable strong pain is recognized, the use of sedation is to be presented.

When the sedative need determination section 180 determines that the pain level is less than the predetermined level in the step S53, the sedative need determination section 180 determines the pain frequency in the step S55. Specifically, the sedative need determination section 180 determines whether or not the number of times of the pain is more than one, or whether or not the duration of the pain is longer than a predetermined time.

When the sedative need determination section 180 determines that the number of times of the pain is more than one or the duration of the pain is longer than the predetermined time in the step S55, the sedative need determination section 180 determines that sedation is required and the support information generation section 150 generates the support information that presents the use of sedation in the step S54. In other words, if the pain frequency is high or the pain is occurring for a long time even though the pain level is low, the use of sedation is to be presented.

When the sedative need determination section 180 determines that the number of times of the pain is only one or the duration of the pain is shorter than the predetermined time in the step S55, the sedative need determination section 180 determines the type of the pain in the step S56. Specifically, the sedative need determination section 180 determines whether or not there is an avoidance operation to avoid the pain in the pain situation recognized in the step S52.

When the sedative need determination section 180 determines that there is no avoidance operation to avoid the pain in the step S56, the sedative need determination section 180 determines that sedation is required and the support information generation section 150 generates the support information that presents the use of sedation in the step S54.

When the sedative need determination section 180 determines that there is an avoidance operation to avoid the pain in the step S56, the sedative need determination section 180 determines whether or not the same avoidance operation was previously presented in the step S57.

When the sedative need determination section 180 determines that the same avoidance operation was previously presented in the step S57, the sedative need determination section 180 determines that sedation is required and the support information generation section 150 generates the support information that presents the use of sedation in the step S54.

When the sedative need determination section 180 determines that the same avoidance operation was not previously presented in the step S57, the sedative need determination section 180 determines that sedation is not required and the support information generation section 150 generates the support information that presents the avoidance operation corresponding to the pain situation recognized in the step S52, in the step S58. In other words, in a case where the pain level is low as well as the pain frequency is low or the duration of the pain is short, the avoidance operation is basically performed by the endoscope operation by a surgeon, manual compression by an assistant, repositioning of a patient, or the like.

However, there is no operation to avoid some types of a pain. For example, there is no operation to avoid the pain situation (9) described above and the like. In such case, the use of sedation is to be presented. In addition, there may be a case where a pain currently being occurring also occurred in the past and the avoidance operation was presented at that time. In such case, since the pain currently being recognized is the pain that could not be prevented or was difficult to prevent even by performing the avoidance operation, the use of sedation is to be presented.

The contents to be presented in the step S54 are contents showing that the use of sedation is considered to be desirable for the situation, for example, "A lot of pain. Recommend the use of sedation", etc.

When the use of sedation is presented in the step S54, information about the pain situation recognized in the step S52 or information about the pain determined in the steps S53 and S55-S57 may be recorded in an electronic health record.

Figure 17:
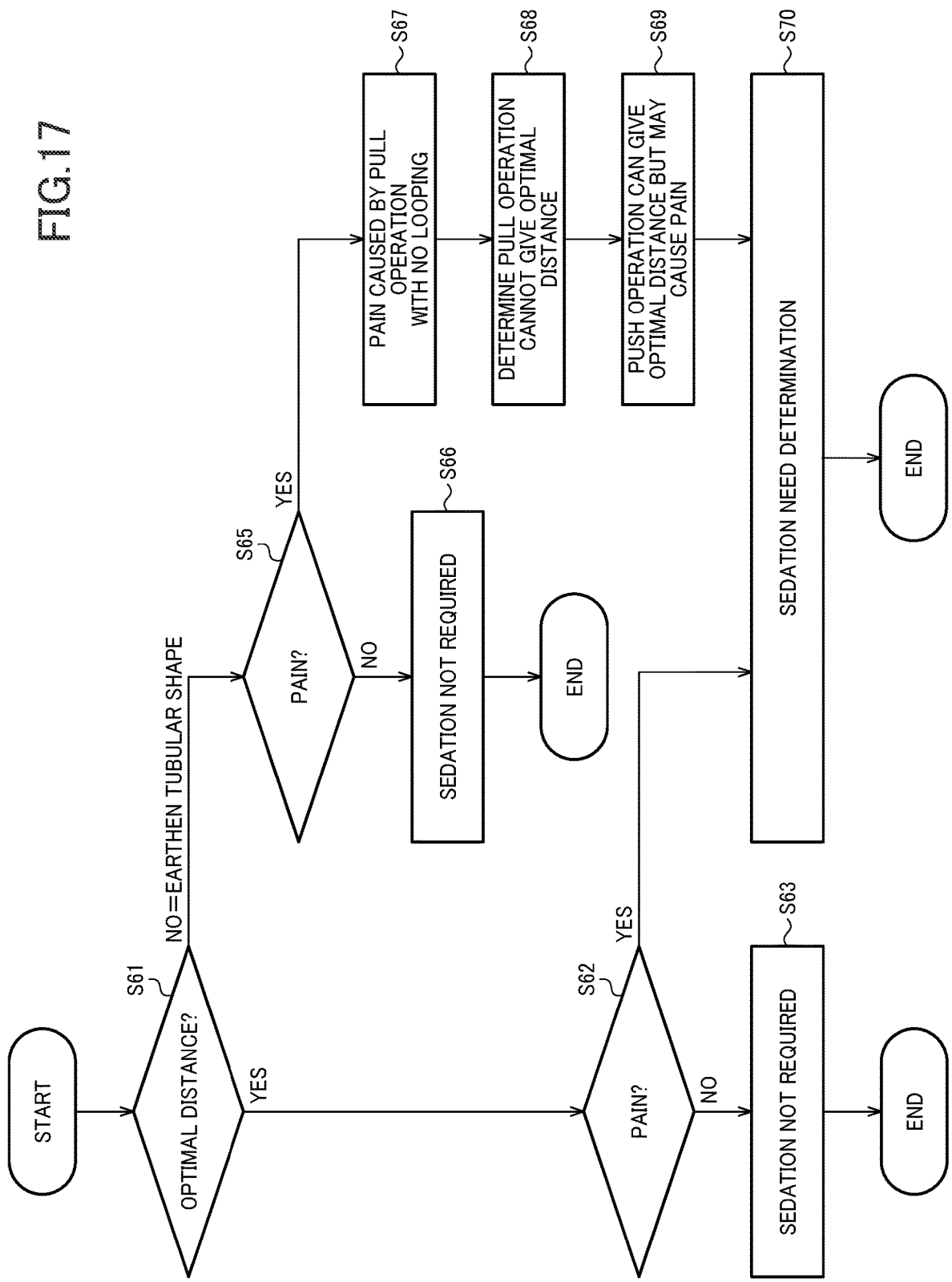
FIG. 17 is a flowchart illustrating a specific example of recognition of a pain situation and determination of a need for sedation based on the recognition result.

FIG. 17 is a flowchart illustrating a specific example of recognition of the pain situation and determination of a need for sedation based on the recognition result. Although described herein is an example of the shaft retention and shortening method, a process flow corresponding to each insertion method and each of the pain situations (1)-(23) described above shall be set.

In the step S61, the latest status determination section 121 determines whether or not the optimal distance is achieved based on the information IFIN.

When the latest status determination section 121 determines that the optimal distance is achieved in the step S61, the pain situation recognition section 130 determines, in the step S62, whether or not the pain situation is caused based on the insertion state recognized by the latest status determination section 121 and the time-series status determination section 122.

When the pain situation recognition section 130 determines that no pain situation is caused in the step S62, the sedative need determination section 180 determines that sedation is not required in the step S63. When the pain situation recognition section 130 determines that the pain situation is caused in the step S62, the sedative need determination section 180 determines, in the step S70, the need for sedation as illustrated in S53 and S55-S57 in FIG. 16.

When the latest status determination section 121 determines that the optimal distance is not achieved in the step S61, the pain situation recognition section 130 determines, in the step S65, whether or not the pain situation is caused based on the insertion state recognized by the latest status determination section 121 and the time-series status determination section 122. When the pain situation recognition section 130 determines that no pain situation is caused in the step S65, the sedative need determination section 180 determines that sedation is not required in the step S66. When the pain situation recognition section 130 determines that the pain situation is caused by the pull operation performed with no looping in the steps S65 and S67, the pain situation recognition section 130 determines, in the steps S68 and S69, that the pull operation cannot give the optical distance, and that the push operation can give the optimal distance but may cause a pain. In the step S70, the sedative need determination section 180 determines the need for sedation as illustrated in S53 and S55-S57 in FIG. 16.

Figure 18:
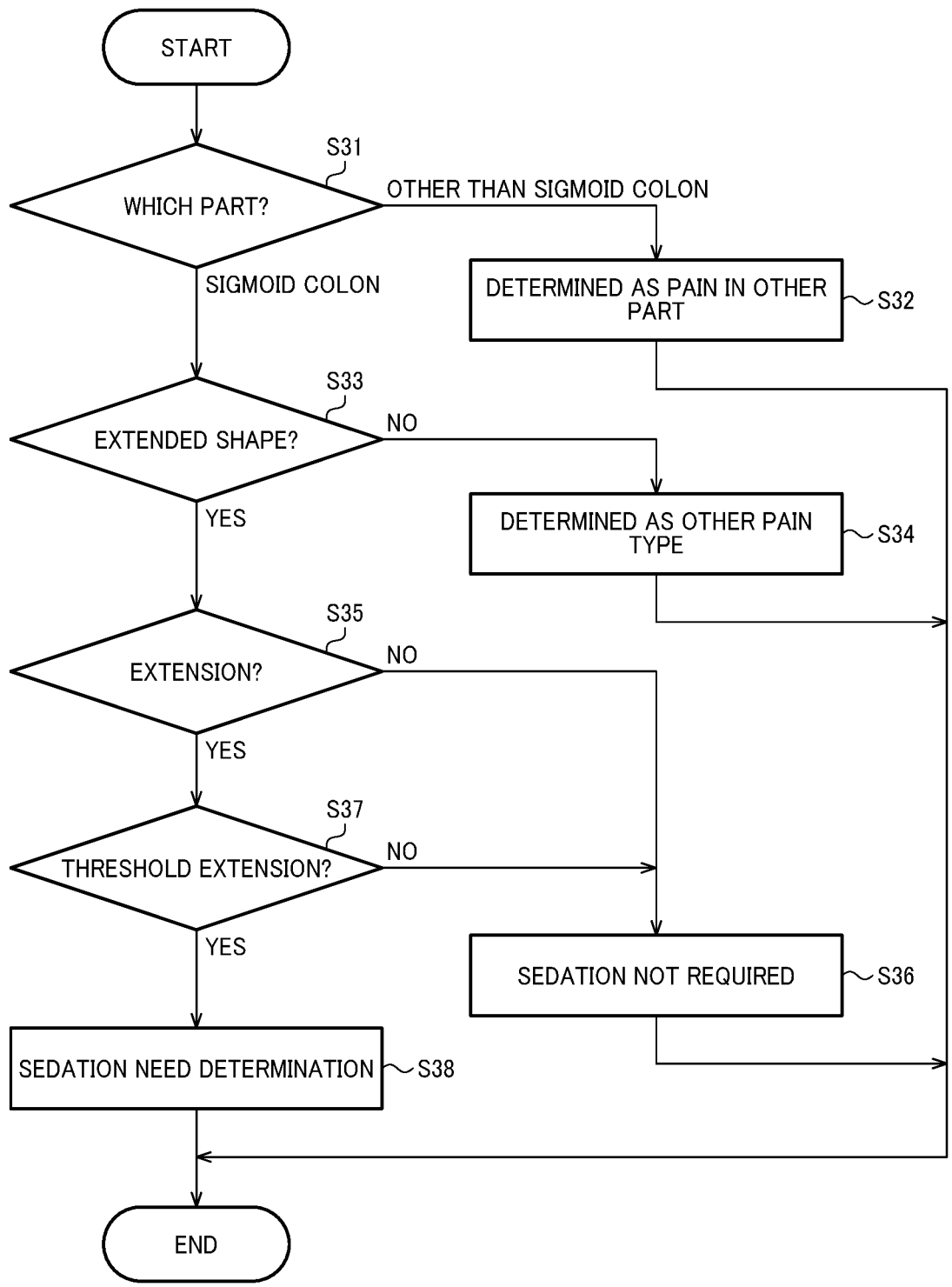
FIG. 18 is a flowchart illustrating a specific example of recognition of a pain situation.
Figure 24:
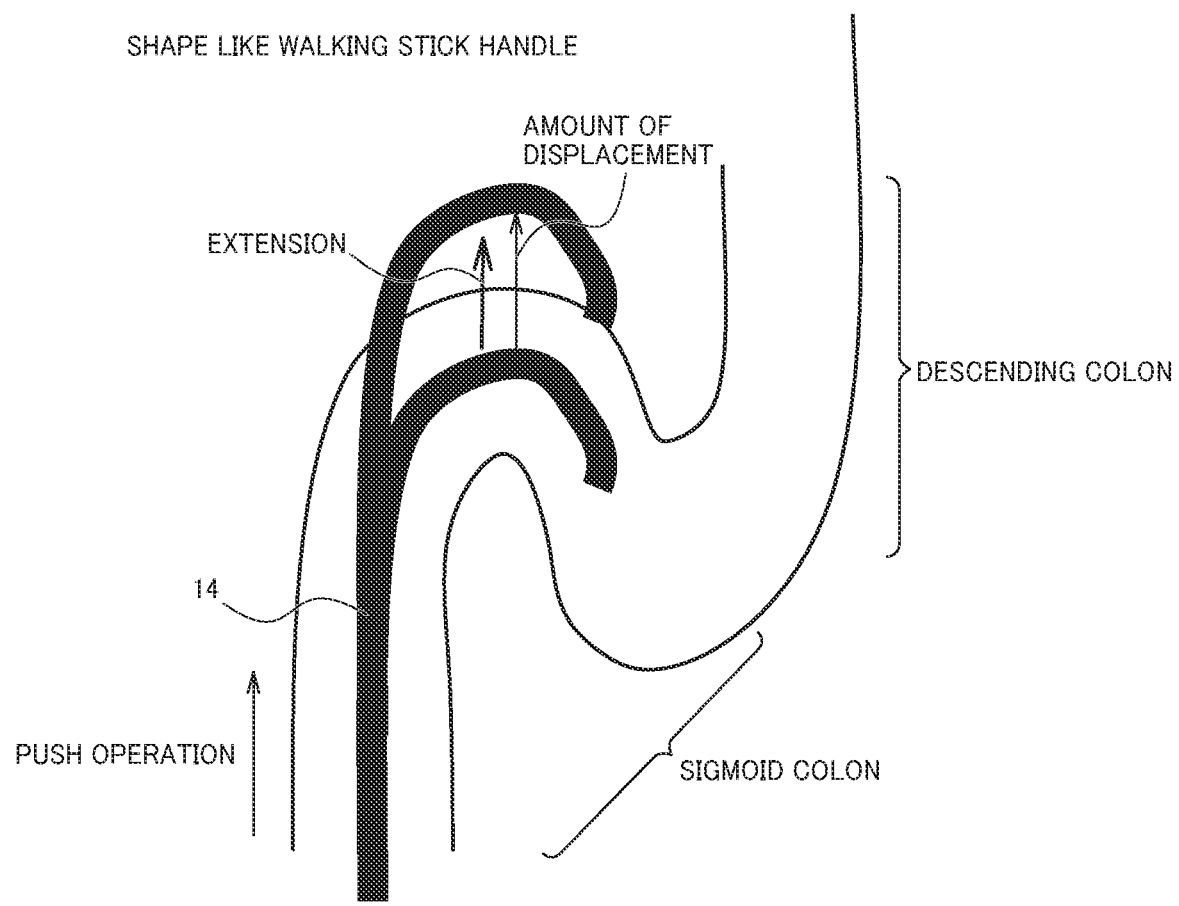
FIG. 24 is a diagram illustrating a specific example of recognition of a pain situation.

FIG. 18 is a flowchart illustrating a specific example of recognition of the pain situation. Described herein is an example of the pain situation where extension of the sigmoid colon occurs, as illustrated in FIG. 24.

In the step S31, the latest status determination section 121 determines the part in which the endoscope insertion section exists based on the endoscopic image and the insertion section shape information. Specifically, the latest status determination section 121 performs image recognition of the endoscopic image and shape recognition of the insertion section shape information, and determines, based on the result of image recognition and the result of shape recognition, the part in which the endoscope insertion section exists.

When the latest status determination section 121 determines that the endoscope insertion section exists in the parts other than the sigmoid colon in the step S31, the pain situation recognition section 130 determines that the pain situation occurs in the other parts in the step S32.

When the latest status determination section 121 determines that the endoscope insertion section exists in the sigmoid colon in the step S31, the latest status determination section 121 determines whether or not the endoscope insertion section has an extended shape in the step S33. The extended shape herein refers to a cane-like shape that projects to the head side and bends to the left flank side, as illustrated in FIG. 24.

When the latest status determination section 121 determines that the endoscope insertion section does not have the extended shape in the step S33, the pain situation recognition section 130 determines it as the other type of the pain situation in the step S34.

When the latest status determination section 121 determines that the endoscope insertion section has the extended shape in the step S33, the latest status determination section 121 determines whether or not extension occurs in the step S35. Specifically, the latest status determination section 121 determines the extension based on the endoscope insertion section being displaced toward the head side while keeping the extended shape, the endoscopic image being stopped or retreated in the section in which the extension is recognized from the latest recognition information, or both.

When the latest status determination section 121 determines that no extension occurs in the step S35, the pain situation recognition section 130 determines that no pain situation due to extension occurs and the sedative need determination section 180 determines that sedation is not required in the step S36.

When the latest status determination section 121 determines that the extension occurs in the step S35, the pain situation recognition section 130 determines whether or not the extension exceeds a threshold in the step S37. Specifically, the pain situation recognition section 130 determines whether or not the amount of displacement of a convex of the endoscope insertion section exceeds the threshold, as illustrated in FIG. 24.

When the pain situation recognition section 130 determines that the extension does not exceed the threshold in the step S37, the pain situation recognition section 130 determines that no pain situation due to the extension occurs, and the sedative need determination section 180 determines that sedation is not required in the step S36.

When the pain situation recognition section 130 determines that the extension exceeds the threshold in the step S37, the pain situation recognition section 130 determines that the pain situation due to the extension occurs, and the sedative need determination section 180 determines the need for sedation as illustrated in S53 and S55-S57 in FIG. 16 in the step S38.

4. Second Detailed Configuration Example of Medical Support System

Figure 19:
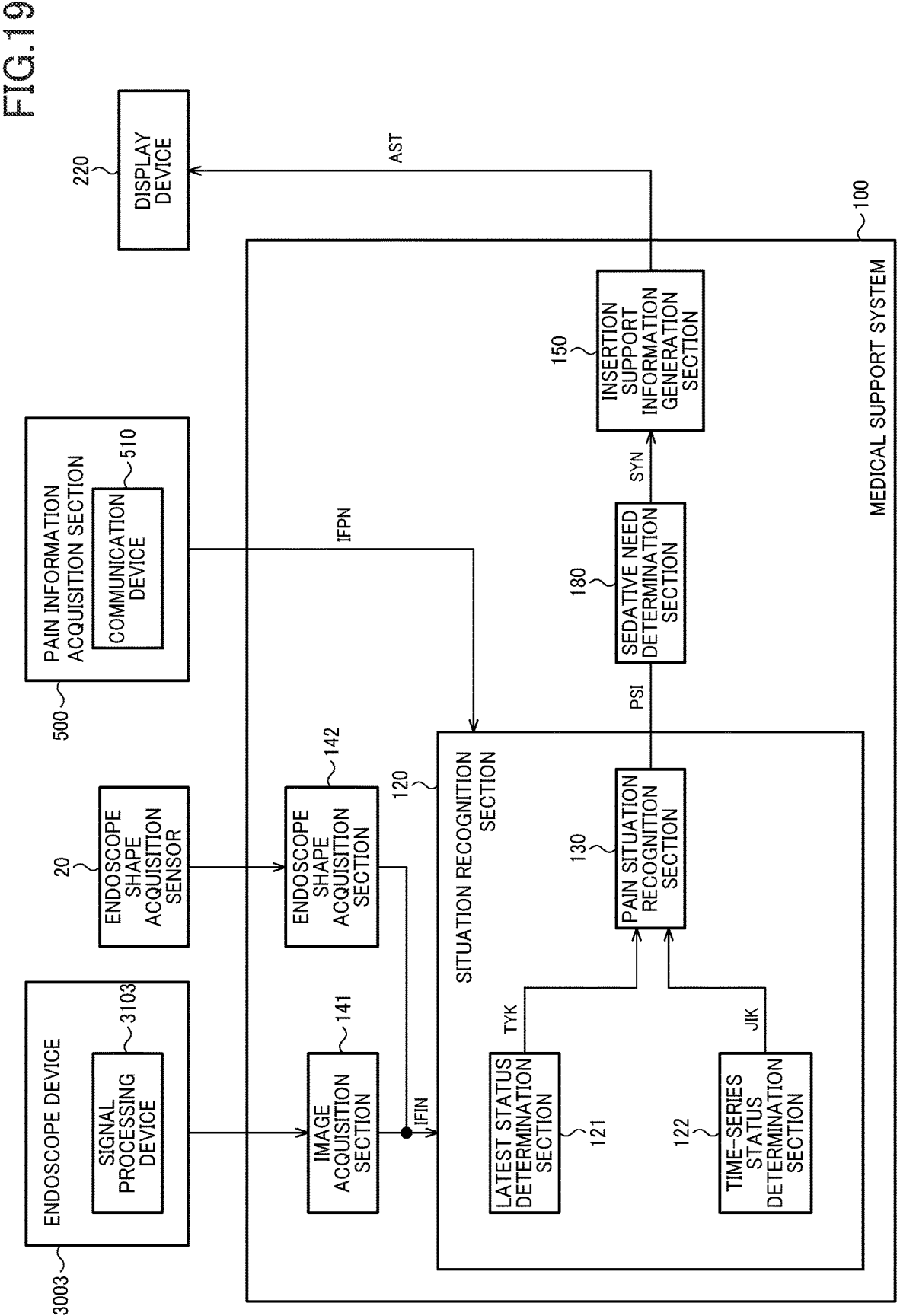
FIG. 19 is a second detailed configuration example of a medical support system.

FIG. 19 is a second detailed configuration example of the medical support system 100. The medical support system 100 includes an image acquisition section 141, an endoscope shape acquisition section 142, the situation recognition section 120, the sedative need determination section 180, and the support information generation section 150. In the present configuration example, for instance, the image acquisition section 141, the endoscope shape acquisition section 142, and the latest status determination section 121 correspond to the past examination information acquisition section 190 in FIGS. 1-3, and the time-series status determination section 122 corresponds to the past examination information acquisition section 190 in FIG. 3. Note that the description of the same components as those already described are omitted as appropriate.

A pain information acquisition section 500 is included in the endoscope system 400. For example, when the medical support system 100 is included in the insertion shape observation device 200, the pain information acquisition section 500 may be included in the insertion shape observation device 200.

The pain information acquisition section 500 includes a communication device 510 that can be operated by a patient or a medical worker according to the pain situation of the patient. The communication device 510 is, for example, a switch or a touch panel. Taking a case where a patient operates a switch for example, the patient holds the switch and presses it when suffering a pain. The pain situation recognition section 130 recognizes occurrence of the pain from the information output from the switch, and the sedative need determination section 180 determines a need for a sedative based on the recognition result. The switch may be a one-step switch or may be a two-step switch that allows recognition of intensity. The switch may be the one capable of communicating only presence or absence of a pain, or the one capable of communicating the information other than the presence or absence of a pain, such as the intensity or duration of a pain. An assistant such as a nurse may hold the switch and press the switch instead of a patient when the patient complains of a pain.

In addition, the pain information acquisition section 500 may include a camera that captures a facial expression of a patient, and may recognize a facial expression of a pain in the captured image, thereby recognizing the pain. Furthermore, the pain information acquisition section 500 may include a microphone that acquires voice from a patient and may recognize from the voice that the patient complains of a pain, thereby recognizing the pain. Output signals from the communication device 510, the result of recognition of the facial expression, or the result of voice recognition is input to the situation recognition section 120 as input pain information INPN.

The image acquisition section 141 receives an endoscopic image sent by the signal processing device 310 of the endoscope device 300, thereby acquiring the endoscopic image. The endoscope shape acquisition section 142 acquires a position and a shape of the endoscope insertion section based on a detected signal from the endoscope shape acquisition sensor 20. The endoscopic image as well as the information about the position and the shape of the endoscope insertion section are input to the situation recognition section 120 as the information IFIN.

Figure 20:
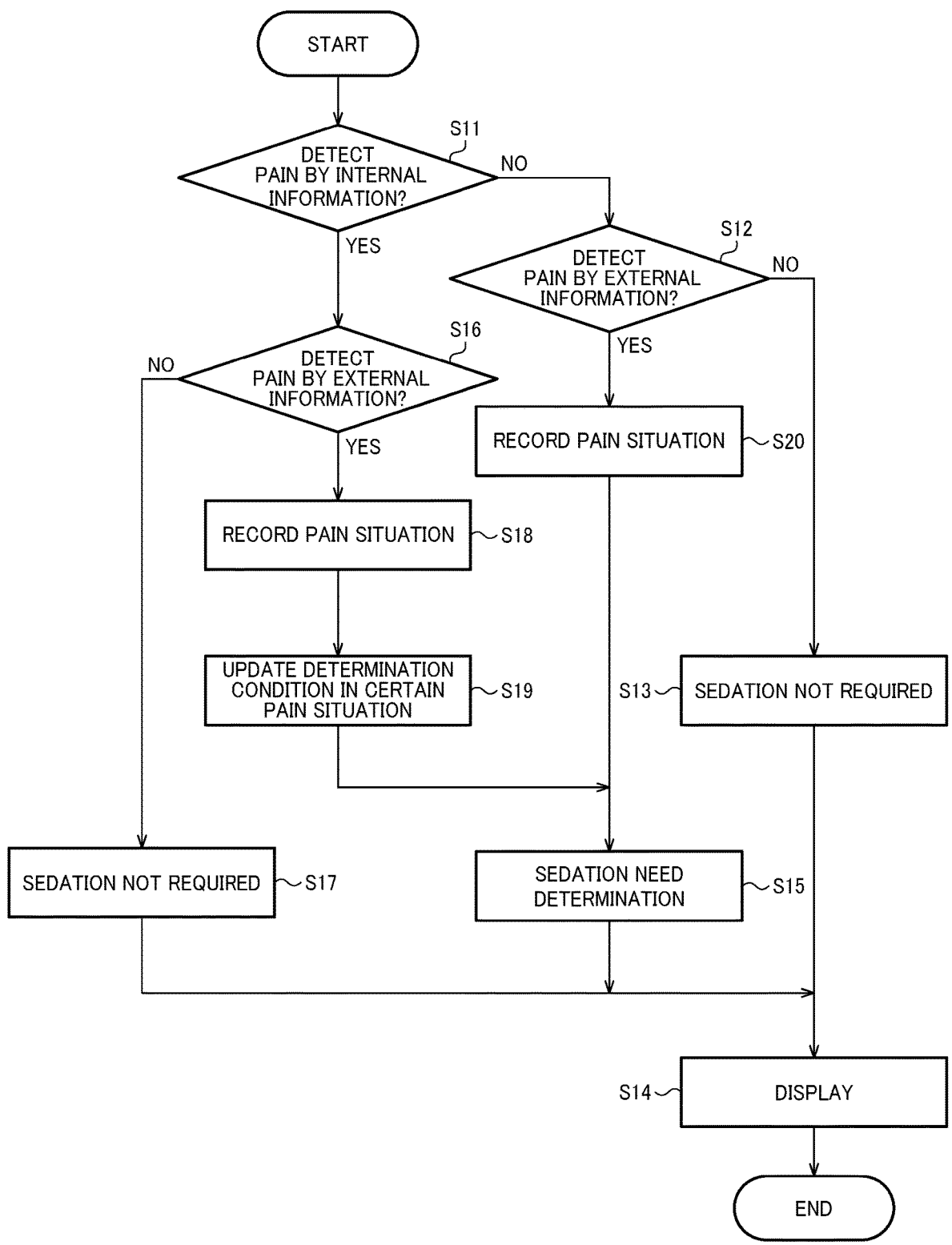
FIG. 20 is a flowchart of processing performed by the medical support system in the second detailed configuration example.

FIG. 20 is a flowchart of processing performed by the medical support system 100 in the second detailed configuration example.

In the step S11, the support information generation section 150 determines whether or not the pain situation recognition section 130 detects the pain situation based on internal information. The internal information is the information other than the input pain information INPN communicated from a patient or a medical worker. In the example of FIG. 19, it is the endoscopic image acquired by the image acquisition section 141, the insertion section shape information acquired by the endoscope shape acquisition section 142, the latest status information TYK output by the latest status determination section 121, the time-series status information JIK output by the time-series status determination section 122, or a combination of any two or more thereof.

When the pain situation recognition section 130 detects the pain situation based on the internal information in the step S11, the support information generation section 150 determines, in the step S16, whether or not the pain situation recognition section 130 detects the pain situation based on external information. The external information is the input pain information INPN communicated from the patient or the medical worker.

When the pain situation recognition section 130 does not detect the pain situation based on the external information in the step S16, the sedative need determination section 180 determines that sedation is not required in the step S17.

When the pain situation recognition section 130 detects the pain situation based on the external information in the step S16, the pain situation recognition section 130 records the detected pain situation as a log in the memory in the step S18. In the step S19, when the detected pain situation corresponds to any of the aforementioned pain situations (1)-(23), the pain situation recognition section 130 updates determination conditions for the corresponding pain situation. For example, if the pain situation is detected by determining the amount of displacement with a threshold, the threshold is to be updated. In the step S15, the sedative need determination section 180 determines the need for sedation as illustrated in S53 and S55-S57 in FIG. 16. When the sedation is determined to be required in the step S15, the support information generation section 150 causes the display device 220 to display the support information presenting the use of sedation in the step S14.

When the pain situation recognition section 130 does not detect the pain situation based on the internal information in the step S11, the support information generation section 150 determines, in the step S12, whether or not the pain situation recognition section 130 detects the pain situation based on the external information.

When the pain situation recognition section 130 does not detect the pain situation based on the external information in the step S12, the sedative need determination section 180 determines that sedation is not required in the step S13.

When the pain situation recognition section 130 detects the pain situation based on the external information in the step S12, it records the pain situation in the step S20. For example, the pain situation is recorded in an electronic health record and the like. When the pain situation recognition section 130 recognizes the pain situation corresponding to none of the aforementioned pain situations (1)-(23) based on the external information, the pain situation is recorded as a patient-specific pain situation such that if a similar pain situation occurs again during the current examination or future examination, it is possible to recognize the pain situation specific to the patient. Next, when sedation is determined to be required in the step S15, the support information generation section 150 causes the display device 220 to display the support information presenting the use of sedation in the step S14.

5. Third and Fourth Detailed Configuration Examples of Medical Support System

Figure 21:
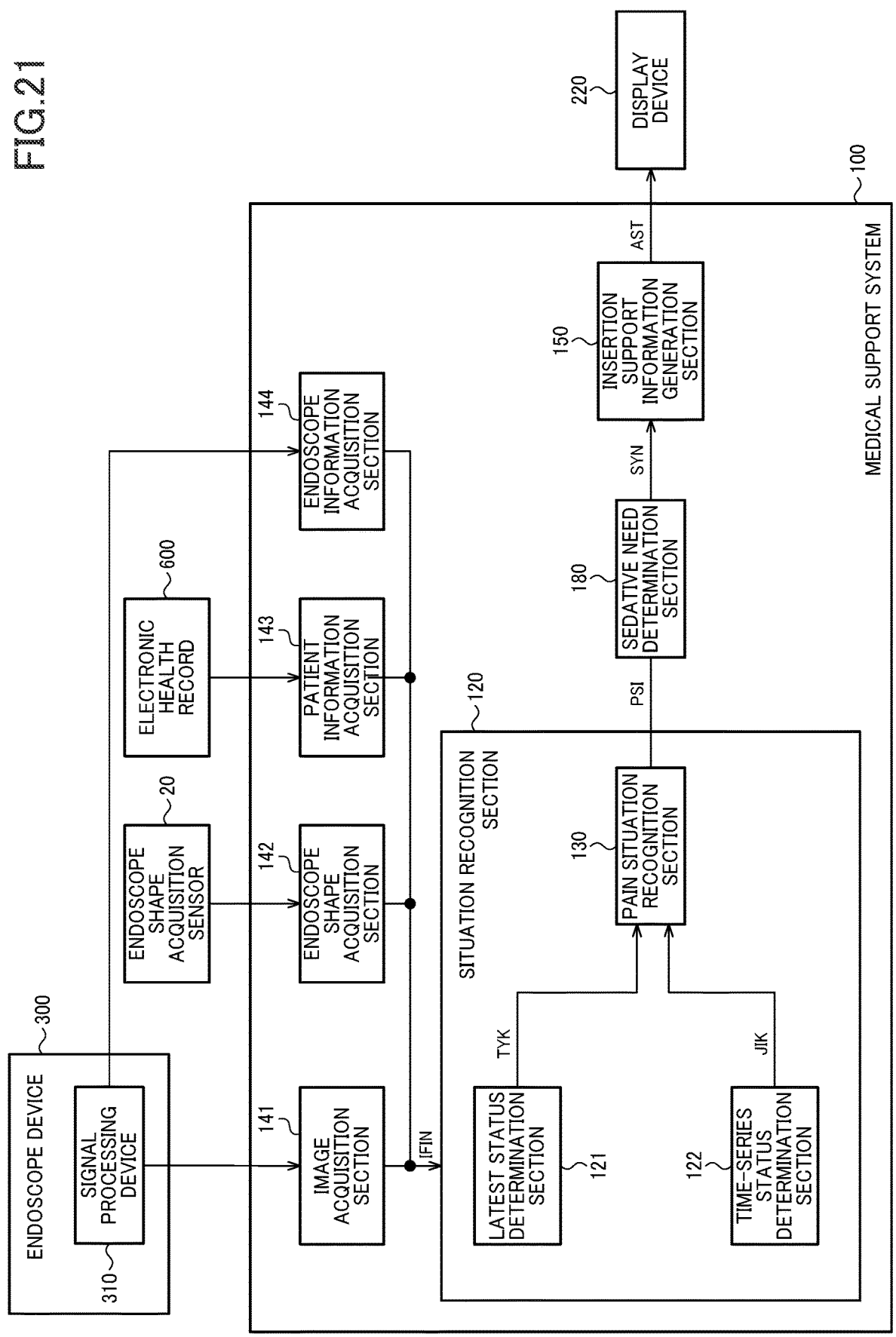
FIG. 21 is a third detailed configuration example of a medical support system.
Figure 22:
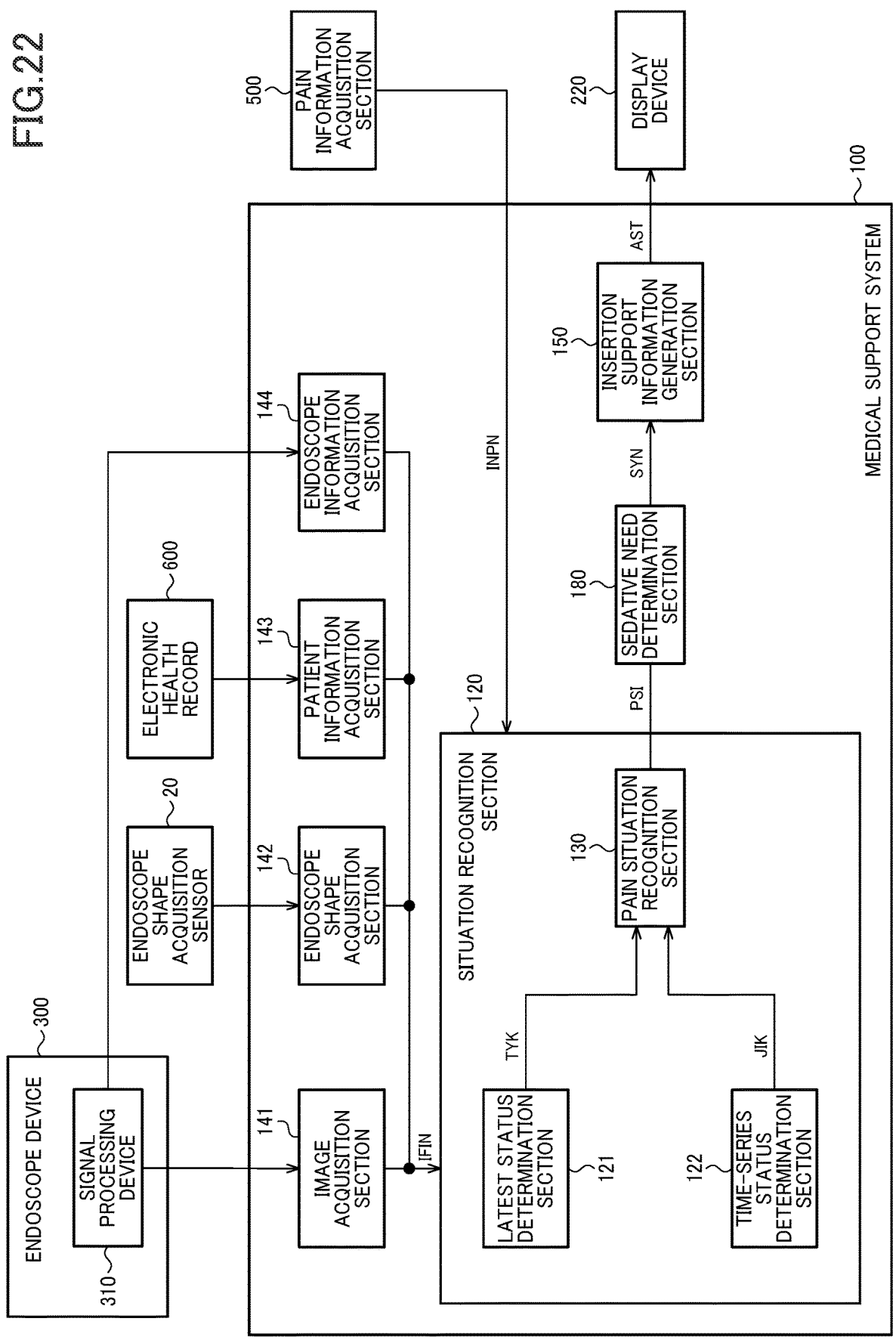
FIG. 22 is a fourth detailed configuration example of a medical support system.

FIG. 21 is a third detailed configuration example of the medical support system 100. The medical support system 100 includes the image acquisition section 141, the endoscope shape acquisition section 142, a patient information acquisition section 143, an endoscope information acquisition section 144, the situation recognition section 120, the sedative need determination section 180, and the support information generation section 150. FIG. 22 is a fourth detailed configuration example of the medical support system 100. In the fourth detailed configuration example, the pain information acquisition section 500 is further added to the third detailed configuration example. In the third and fourth detailed configuration examples, for instance, the image acquisition section 141, the endoscope shape acquisition section 142, the latest status determination section 121, a part of the patient information acquisition section 143, and the endoscope information acquisition section 144 correspond to the past examination information acquisition section 190 in FIGS. 1-3, and a part of the patient information acquisition section 143 and the time-series status determination section 122 correspond to the past examination information acquisition section 190 in FIG. 3. Note that the description of the same components as those already described are omitted as appropriate.

An electronic health record 600 accumulates the patient information being information about an attribute of a patient. The electronic health record 600 is stored in a storage device provided outside the endoscope system 400, for example, and the patient information acquisition section 143 acquires the electronic health record 600 from the storage device.

The patient information is, for example, a physique, gender, age, a medical history, and body fat percentage of a patient, or a combination of any two or more thereof. The physique is BMI, height, weight, or a combination of any two or more thereof. Depending on these attributes of the patient, the pain situation likely to occur or a threshold for a pain may differ. As an example of the situation, a skinny female is more likely to suffer a pain, or a male suffers a pain upon extension in a head direction by 50 mm with the N loop. By recognizing the pain situation based on the patient information, it is possible to appropriately recognize the pain situation specific to the patient, thereby enabling appropriate determination of the need for sedation.

Furthermore, the patient information may include the past examination information. The past examination information is indicative of which insertion methods was used, how long it took to insert, whether or not a pain occurred, a trajectory of insertion, which scope was used, whether or not a sedative was used, or a combination of any two or more thereof. By recognizing the pain situation based on such past examination information, it is possible to appropriately recognize the pain situation specific to the patient, thereby enabling appropriate determination of the need for sedation.

The endoscope information acquisition section 144 acquires the endoscope kind information from the signal processing device 310 of the endoscope device 300. The thickness of the endoscope insertion section differs depending on the endoscope kind. Accordingly, a pain likely to occur can differ depending on the endoscope kind. Hence, by recognizing the pain situation based on the endoscope kind information, it is possible to appropriately recognize the pain situation that differs depending on the endoscope kind, thereby enabling appropriate determination of the need for sedation.

6. Fifth Detailed Configuration Example of Medical Support System

Figure 23:
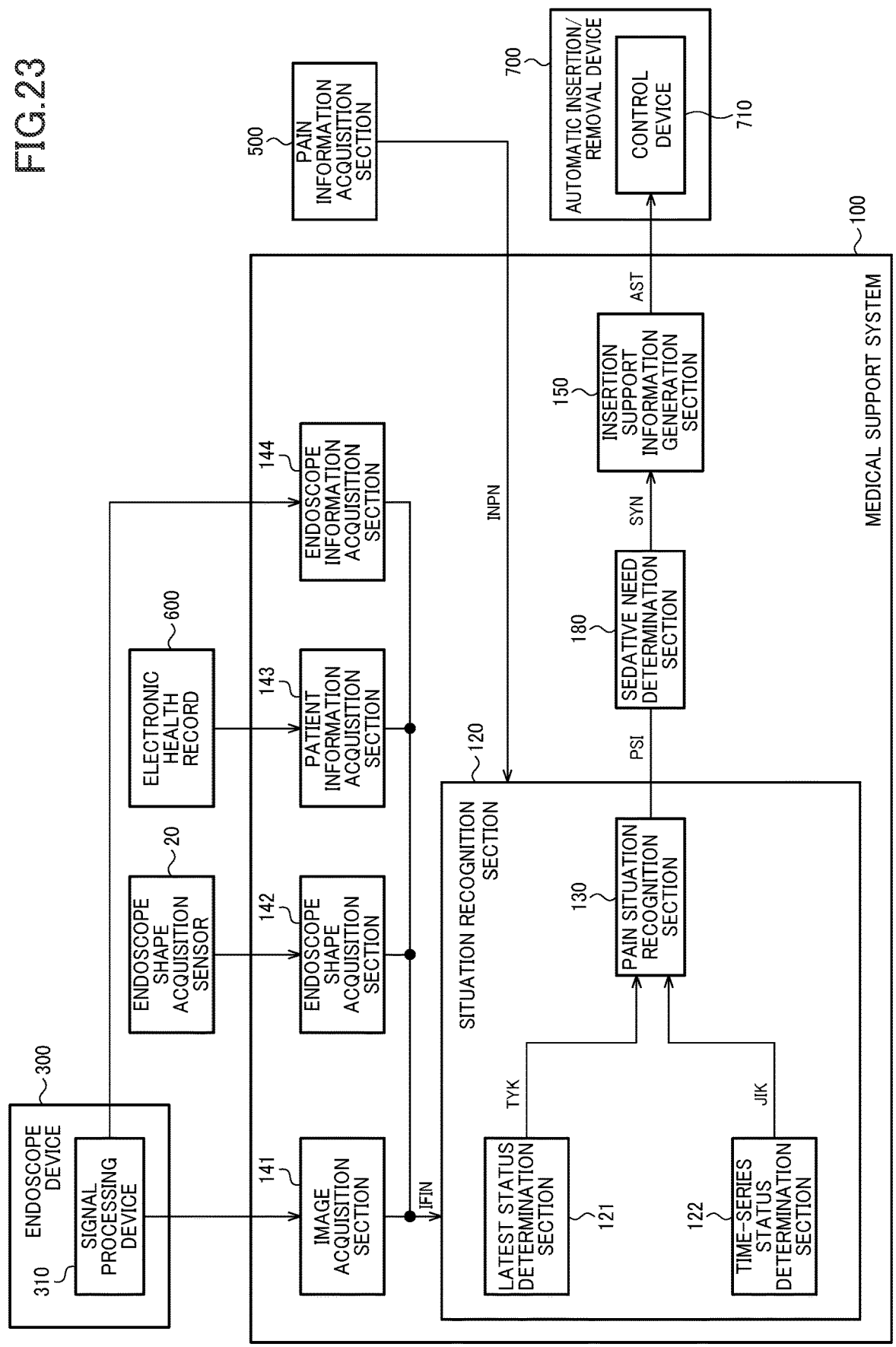
FIG. 23 is a fifth detailed configuration example of a medical support system.

FIG. 23 is a fifth detailed configuration example of the medical support system 100. The medical support system 100 includes the image acquisition section 141, the endoscope shape acquisition section 142, the patient information acquisition section 143, the endoscope information acquisition section 144, the situation recognition section 120, the sedative need determination section 180, and the support information generation section 150. Note that the description of the same components as those already described are omitted as appropriate.

The support information generation section 150 may output support information AST to a control device 710 of an automatic insertion/removal device 700, thereby controlling the automatic insertion/removal device 700. The automatic insertion/removal device 700 is a robot that automatically or semi-automatically inserts and removes an endoscope, and the control device 710 is a device that controls the robot. The support information AST is output as a control signal for the control device 710. The support information generation section 150 may output a control signal for stopping the operation of the automatic insertion/removal device 700, for example, when the sedative need determination section 180 determines that sedation is required.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

The invention claimed is:

1. A medical support system comprising:
   a processor configured to:
      acquire examination status information about a status of an endoscopy using an endoscope;
      classify an insertion state of the endoscope based on at least one of the following information associated with the endoscopy and output the examination status information including a result of the classification:
         endoscopic image recognition information being information about a result of recognition of an endoscopic image; insertion section shape information being information about a shape of an endoscope insertion section; or operation recognition information being information about a change in at least one of the shape or a position of the endoscope insertion section; and
      determine a need for a sedative based on the insertion state indicated by the result of the classification.

2. The medical support system as defined in claim 1, wherein the processor
   acquires pain situation information upon recognition of a pain situation based on the examination status information, the pain situation being a situation where a patient is suffering a pain during the endoscopy, and
   determines the need for the sedative based on the pain situation information.

3. The medical support system as defined in claim 1, wherein the examination status information further includes at least one of the following information associated with the endoscopy: patient facial expression information being information about a facial expression of a patient during the endoscopy; pain communication information being information output from a communication device operated by the patient or a medical worker; endoscope kind information being information about a kind of the endoscope insertion section used for the endoscopy; or patient information being information about an attribute of the patient.

4. The medical support system as defined in claim 1, wherein
   the operation recognition information includes insertion section shape displacement information being information about shape displacement of the endoscope insertion section, and
   the processor performs the classification based on the insertion section shape information and the insertion section shape displacement information.

5. The medical support system as defined in claim 4, wherein
   the insertion section shape displacement information includes shape displacement amount information being information about magnitude of the shape displacement, and
   the processor performs the classification based on the insertion section shape information and the shape displacement amount information.

6. The medical support system as defined in claim 1, wherein the processor generates support information indicating that the sedative is required when the sedative is determined to be required by the determination of the need.

7. The medical support system as defined in claim 1, wherein the processor determines that the sedative is required when a situation where a pain is caused by extension of an intestinal wall of a large intestine, a situation where a pain is caused by a mesentery being pulled, a situation where a pain is caused by an endoscope insertion section pushing the intestinal wall, or a situation where a pain is caused by a relationship between a fixed part of the large intestine and the endoscope insertion section is recognized based on the examination status information.

8. The medical support system as defined in claim 1, wherein the processor determines that the sedative is required when a situation where a push up operation toward a flank or head side is performed near SDJ by an angle operation of the endoscope is recognized based on the examination status information.

9. The medical support system as defined in claim 1, wherein the processor determines that the sedative is required when a situation where a push up operation toward a head side is performed near SDJ by a torque operation and an angle operation of the endoscope is recognized based on the examination status information.

10. The medical support system as defined in claim 1, wherein the processor determines that the sedative is required when a situation where an operation is performed near SDJ with an endoscope insertion section being bent is recognized based on the examination status information.

11. The medical support system as defined in claim 1, wherein the processor determines that the sedative is required when a situation where a pull operation is performed with looping of the endoscope is recognized based on the examination status information.

12. The medical support system as defined in claim 1, wherein the processor determines that the sedative is required when a situation where a push operation is performed while a distal end of an endoscope insertion section exists in any of a splenic flexure, a transverse colon, or a hepatic flexure and a re-loop is formed in a sigmoid colon is recognized based on the examination status information.

13. The medical support system as defined in claim 1, wherein the processor determines that the sedative is required when a situation where a distal end of an endoscope insertion section exists in any of a splenic flexure, a transverse colon, or a hepatic flexure and a pull operation is performed upon addressing a re-loop in a sigmoid colon is recognized based on the examination status information.

14. The medical support system as defined in claim 1, wherein the processor generates support information for a user based on the determined need for the sedative.

15. The medical support system as defined in claim 1, wherein the processor
acquires the examination status information regarding whether or not an intestinal wall comes close to a tip of the endoscope due to suction by the endoscope, and
determines that the sedative is required when the intestinal wall does not come close to the tip of the endoscope even though the suction by the endoscope is performed.

16. The medical support system as defined in claim 1, wherein the processor
acquires past examination information being information about a past endoscopy, and
determines the need for the sedative based on the past examination information.

17. The medical support system as defined in claim 16, wherein the processor acquires, as the past examination information, at least one of the following information associated with a past examination: a result of determination of the need for the sedative, contents of support information, endoscopic image recognition information being information about a result of recognition of an endoscopic image, insertion section shape information being information about a shape of an endoscope insertion section, or operation recognition information being information about a change in at least one of the shape or a position of the endoscope insertion section.

18. An endoscope system comprising:
an endoscope used for an endoscopy; and
a processor configured to:
  acquire examination status information about a status of the endoscopy using the endoscope;
  classify an insertion state of the endoscope based on at least one of the following information associated with the endoscopy and output the examination status information including a result of the classification:
    endoscopic image recognition information being information about a result of recognition of an endoscopic image; insertion section shape information being information about a shape of an endoscope insertion section; or operation recognition information being information about a change in at least one of the shape or a position of the endoscope insertion section; and
  determine a need for a sedative based on the insertion state indicated by the result of the classification.

19. A medical support method comprising:
acquiring examination status information about a status of an endoscopy using an endoscope;
  classifying an insertion state of the endoscope based on at least one of the following information associated with the endoscopy and outputting the examination status information including a result of the classification:
  endoscopic image recognition information being information about a result of recognition of an endoscopic image; insertion section shape information being information about a shape of an endoscope insertion section; or operation recognition information being information about a change in at least one of the shape or a position of the endoscope insertion section; and
  determining a need for a sedative based on the insertion state indicated by the result of the classification.

* * * * *